United States Patent
Agarwal

(10) Patent No.: US 11,416,166 B2
(45) Date of Patent: Aug. 16, 2022

(54) DISTRIBUTED FUNCTION PROCESSING WITH ESTIMATE-BASED SCHEDULER

(71) Applicant: Western Digital Technologies, Inc., San Jose, CA (US)

(72) Inventor: Dinesh Kumar Agarwal, Bangalore (IN)

(73) Assignee: Western Digital Technologies, Inc., San Jose, CA (US)

(*) Notice: Subject to any disclaimer, the term of this patent is extended or adjusted under 35 U.S.C. 154(b) by 0 days.

(21) Appl. No.: 16/913,383

(22) Filed: Jun. 26, 2020

(65) Prior Publication Data

US 2021/0405915 A1  Dec. 30, 2021

(51) Int. Cl.
*G06F 3/00* (2006.01)
*G06F 3/06* (2006.01)

(52) U.S. Cl.
CPC .......... *G06F 3/0655* (2013.01); *G06F 3/0604* (2013.01); *G06F 3/067* (2013.01)

(58) Field of Classification Search
CPC ....... G06F 3/0655; G06F 3/0604; G06F 3/067
See application file for complete search history.

(56) References Cited

U.S. PATENT DOCUMENTS

| | | | | |
|---|---|---|---|---|
| 10,476,985 B1* | 11/2019 | Spina | ............... | G06F 9/4881 |
| 2010/0083203 A1* | 4/2010 | Bose | ............... | G06F 30/367 |
| | | | | 716/113 |
| 2014/0359050 A1* | 12/2014 | Butt | ............... | G06F 3/0655 |
| | | | | 709/214 |
| 2015/0178419 A1* | 6/2015 | Li | ............... | G06F 9/5066 |
| | | | | 703/2 |
| 2016/0112531 A1* | 4/2016 | Milton | ............... | G06F 9/5083 |
| | | | | 709/205 |
| 2019/0324422 A1* | 10/2019 | Capodanno | ........ | G05B 19/0428 |
| 2020/0257466 A1* | 8/2020 | Peterson | ............... | G06N 20/00 |
| 2021/0049078 A1* | 2/2021 | Khan | ............... | G06F 3/0608 |

OTHER PUBLICATIONS

Gautam, Jyoti V., et al., (2017). Empirical Study of Job Scheduling Algorithms in Hadoop MapReduce, Cybernetics and Information Technologies, Apr. 2017, pp. 146-163, vol. 17, No. 1.
Nguyen, Phuong, et al., A Hybrid Scheduling Algorithm for Data Intensive Workloads in a MapReduce Environment, Conference Paper, 2012 IEEE/ACM Fifth Intl. Conferene on Utlity and Cloud Computing, Nov. 2012, p. 161-167.
Nicolae, Bogdan, et al., BlobSeer: Bringing High Throughput under Heavy Concurrency to Hadoop Map/Reduce Applications, Conference Paper, IEEE Xplore, May 2010, (12 pages).

* cited by examiner

*Primary Examiner* — Craig S Goldschmidt
(74) *Attorney, Agent, or Firm* — Patent Law Works LLP

(57) ABSTRACT

Systems and methods for distributed storage and processing systems using estimate-based schedulers are described. A node receives estimated processing data for each storage device including redundant copies of data chunks for a data unit. The node determines, based on the estimated processing data and data paths to each data chunk, a task time estimate for data paths to each data chunk and selects data paths for at least one copy of each data chunk to be processed using a corresponding set of compute tasks. The compute tasks are sent for processing based on the assignments of the node.

20 Claims, 9 Drawing Sheets

DISTRIBUTED FUNCTION PROCESSING WITH ESTIMATE-BASED SCHEDULER

TECHNICAL FIELD

The present disclosure generally relates to distributed data systems and, more particularly, to processing redundant data across distributed storage nodes.

BACKGROUND

Often, distributed storage systems are used to store large amounts (e.g., terabytes, petabytes, exabytes, etc.) of data, such as objects, blocks, or files in a distributed and fault tolerant manner with a predetermined level of redundancy. It may be advantageous to process this data using distributed computing that divides large processing tasks into smaller tasks handled by multiple computers, ideally with proximity to the data being processed.

These large-scale storage systems may support the processing of stored data within data nodes and/or storage devices to support applications, such as video encoding and decoding, machine learning, etc. The compute tasks that make up such processing may be distributed across data node or host systems, with each host system accessing locally stored data to limit the amount of data that needs to be transferred to the host system and/or conserve other host system resources. In some configurations, the data nodes may be assigned a volume of data to be processed, such as a large data file, and a target processing time calculated to meet required service levels and/or synchronize with other systems executing other parts of a larger processing task. For example, a large data file in a Hadoop distributed file system (HDFS) may be divided into data blocks of a default size, given unique block identifiers, and distributed among the data nodes.

In some configurations, these data blocks may also be replicated so that redundant copies of each data block in the data file are distributed among different data nodes to provide reliability and performance when nodes fail, become temporarily unavailable, or are impacted by latency, excess load, etc. The locations of each data block and each copy of each data block may be maintained in a metadata store, such as a name node, for managing access to and processing of the data file. When the distributed storage system receives a request to perform operations against a data unit, such as a data file, the distributed storage system may determine which copies of the data chunks (e.g., data blocks) to use to get all parts of the data unit.

To process the data chunks more efficiently, some distributed storage systems may distribute processing across storage nodes, such as data nodes, to allow parallel retrieval and processing of the data chunks. A compute task scheduler, such as a scheduler associated with a metadata store or name node, may determine which nodes include data chunks for the data unit and select a complete set of data chunks to process. For example, data nodes containing redundant copies of a data chunk may be randomly selected for the compute tasks. However, random selection and other selection methods may result in inefficient processing and delays caused by node failures, latency, and other factors.

As distributed storage systems scale and demand for real-time processing near the storage devices increases, inefficient distribution of compute tasks may result in wasted resources, higher costs, and poor or inconsistent performance of data retrieval and processing tasks. A need exists for at least storage systems that retrieve and process data using schedulers with estimate-based logic to improve efficiency and reliability.

SUMMARY

Various aspects for distributed storage systems for function processing, particularly using estimate-based schedulers, are described.

One general aspect includes a system that includes at least one memory, at least one processor, and a host controller, stored in the at least one memory and executable by the at least one processor, to perform operations including: receiving estimated processing data for a plurality of storage nodes, where the plurality of storage nodes includes redundant copies of data chunks for processing in a set of compute tasks; determining, based on estimated processing data and a plurality of data paths to redundant copies of each target data chunk, a task time estimate for each data path of the plurality of data paths; and select at least one data path for each target data chunk for processing in the set of compute tasks; and sending the set of compute tasks using the selected at least one data path for each target data chunk.

Implementations may include one or more of the following features. The operations may further include: sending a series of sets of compute tasks for processing data in the plurality of storage nodes; determining a request time during a processing period for a prior set of compute tasks; sending, at the request time, an estimate request to each storage node of the plurality of storage nodes; and receiving the estimated processing data for the set of compute tasks during the processing period for the prior set of compute tasks. The series of sets of compute tasks may include the set of compute tasks and the prior set of compute tasks. The estimated processing data may be selected from at least one of: a task processing time estimate; a latency estimate; a soft error estimate; and a hard error estimate. The operations may further include: determining, based on the task processing time estimate, the latency estimate, and the soft error estimate, the task time estimate for each data path of the plurality of data paths; and comparing, for redundant copies of a target data chunk, the task time estimate for each data path to select the at least one data path to the target data chunk. The operations may further include: determining a processing time threshold for the set of compute tasks: and selecting, using the processing time threshold, the at least one data path for each target data chunk. Each data path to each storage node of the plurality of storage nodes includes a data processing node configured to execute a compute task for a corresponding data chunk in a target storage device. The operations may further include: determining a combined task time for at least two compute tasks for a target data processing node; comparing the combined task time to the processing time threshold for the set of compute tasks; and selecting, responsive to the processing time threshold meeting at least the combined task time, data paths through the target data processing node for target data chunks for the at least two compute tasks. Each target data chunk may have a corresponding compute task in the set of compute tasks. The operations may further include, responsive to the task time estimate for at least one data path to redundant copies of a target data chunk exceeding the processing time threshold: splitting the target data chunk into at least two data chunk portions; splitting a corresponding compute task into at least two compute task portions; selecting a first data path for a first storage node from the plurality of storage nodes for a first data chunk portion of the at least two data chunk"

portions; and selecting a second data path for a second storage node from the plurality of storage nodes for a second data chunk portion of the at least two data chunk portions. The operations may further include, responsive to the task time estimate for at least one data path to redundant copies of a target data chunk exceeding the processing time threshold: selecting a first data path for a first storage node from the plurality of storage nodes for the target data chunk and corresponding compute task; selecting a second data path for a second storage node from the plurality of storage nodes for the target data chunk and corresponding compute task; and returning a compute result for a first completed corresponding compute task from between the first data path and the second data path. The operations may further include: receiving actual task time values from the set of compute tasks that used the selected at least one data path for each target data chunk; determining at least one variance between actual task time values and task time estimates; determining, based on the at least one variance, at least one correction factor for an estimator used to generate task time estimates; and sending the at least one correction factor to the estimator for generating future task time estimates. The system may include a plurality of storage nodes configured to: store, in a plurality of storage devices, a target data file, where the redundant copies of data chunks correspond to redundant portions of the target data file; and determine estimated processing data for the set of compute tasks. The system may include a plurality of data processing nodes configured to: process the set of compute tasks using the target data chunks, where the at least one data path to each target data chunk includes at least one corresponding data processing node of the plurality of data processing nodes; and return a compute task result for each compute task of the set of compute tasks.

Another general aspect includes a computer-based method that includes: receiving estimated processing data for a plurality of storage nodes, where the plurality of storage nodes includes redundant copies of data chunks for processing in a set of compute tasks; determining, based on estimated processing data and a plurality of data paths to redundant copies of each target data chunk, a task time estimate for each data path of the plurality of data paths; selecting at least one data path for each target data chunk to be processed using the set of compute tasks; and sending the set of compute tasks for processing using the selected at least one data path for each target data chunk.

Implementations may include one or more of the following features. The computer-based method may include: sending a series of sets of compute tasks for processing data in the plurality of storage nodes, where the series of sets of compute tasks includes the set of compute tasks and a prior set of compute tasks; determining a request time during a processing period for the prior set of compute tasks; sending, at the request time, an estimate request to each storage device of the plurality of storage nodes; and receiving the estimated processing data for the set of compute tasks during the processing period for the prior set of compute tasks. The estimated processing data may be selected from at least one of: a task processing time estimate; a latency estimate; a soft error estimate; and a hard error estimate. The computer-based method may include: determining, based on the task processing time estimate, the latency estimate, and the soft error estimate, the task time estimate for each data path of the plurality of data paths; and comparing, for redundant copies of a target data chunk, the task time estimate for each data path to select the at least one data path to the target data chunk. The computer-based method may include: determining a processing time threshold for the set of compute tasks; and selecting, using the processing time threshold, the at least one data path for each target data chunk. The computer-based method may include: determining a combined task time for at least two compute tasks for a data processing node; comparing the combined task time to the processing time threshold for the set of compute tasks; and selecting, responsive to the processing time threshold meeting at least the combined task time, data paths through the data processing node for target data chunks for the at least two compute tasks. The computer-based method may include, responsive to the task time estimate for at least one data path to redundant copies of a target data chunk exceeding the processing time threshold: splitting the target data chunk into at least two data chunk portions; splitting a corresponding compute task into at least two compute task portions; selecting a first data path for a first storage device from the plurality of storage nodes for a first data chunk portion of the at least two data chunk portions; and selecting a second data path for a second storage device from the plurality of storage nodes for a second data chunk portion of the at least two data chunk portions. The computer-based method may include, responsive to the task time estimate for at least one data path to redundant copies of a target data chunk exceeding the processing time threshold: selecting a first data path for a first storage node from the plurality of storage nodes for the target data chunk and corresponding compute task; selecting a second data path for a second storage node from the plurality of storage nodes for the target data chunk and corresponding compute task; and returning a compute result for a first completed corresponding compute task from between the first data path and the second data path. The computer-based method may include: receiving actual task time values from the set of compute tasks that used the selected at least one data path for each target data chunk; determining at least one variance between actual task time values and task time estimates; determining, based on the at least one variance, at least one correction factor for an estimator used to generate task time estimates; and sending the at least one correction factor to the estimator for generating future task time estimates.

One general aspect includes a system that includes: a plurality of storage nodes configured to store, in a plurality of storage devices, a target data file as redundant copies of data chunks; a plurality of data processing nodes corresponding to the plurality of storage nodes and configured to process a set of compute tasks using the data chunks for the target data file; means for receiving estimated processing data for the plurality of storage devices for each redundant copy of the redundant copies of data chunks; means for determining, based on the estimated processing data and a plurality of data paths to redundant copies of each target data chunk, a task time estimate for each data path of the plurality of data paths; means for selecting at least one data path for each data chunk to be processed using the set of compute tasks; and means for sending the set of compute tasks for processing using the selected at least one data path for each data chunk.

The various embodiments advantageously apply the teachings of distributed storage networks and/or systems to improve the functionality of such computer systems. The various embodiments include operations to overcome or at least reduce the issues previously encountered on the storage networks and/or systems and, accordingly, are more reliable and/or efficient than other computing networks. That is, the various embodiments disclosed herein include hardware and/or software with functionality to improve the processing of distributed and redundant data chunks for a data unit, such as by using a scheduler to gather task time estimates and determine improved assignments of compute tasks. Accordingly, the embodiments disclosed herein provide various improvements to storage networks and/or storage systems.

It should be understood that language used in the present disclosure has been principally selected for readability and instructional purposes, and not to limit the scope of the subject matter disclosed herein.

DETAILED DESCRIPTION

Figure 1:
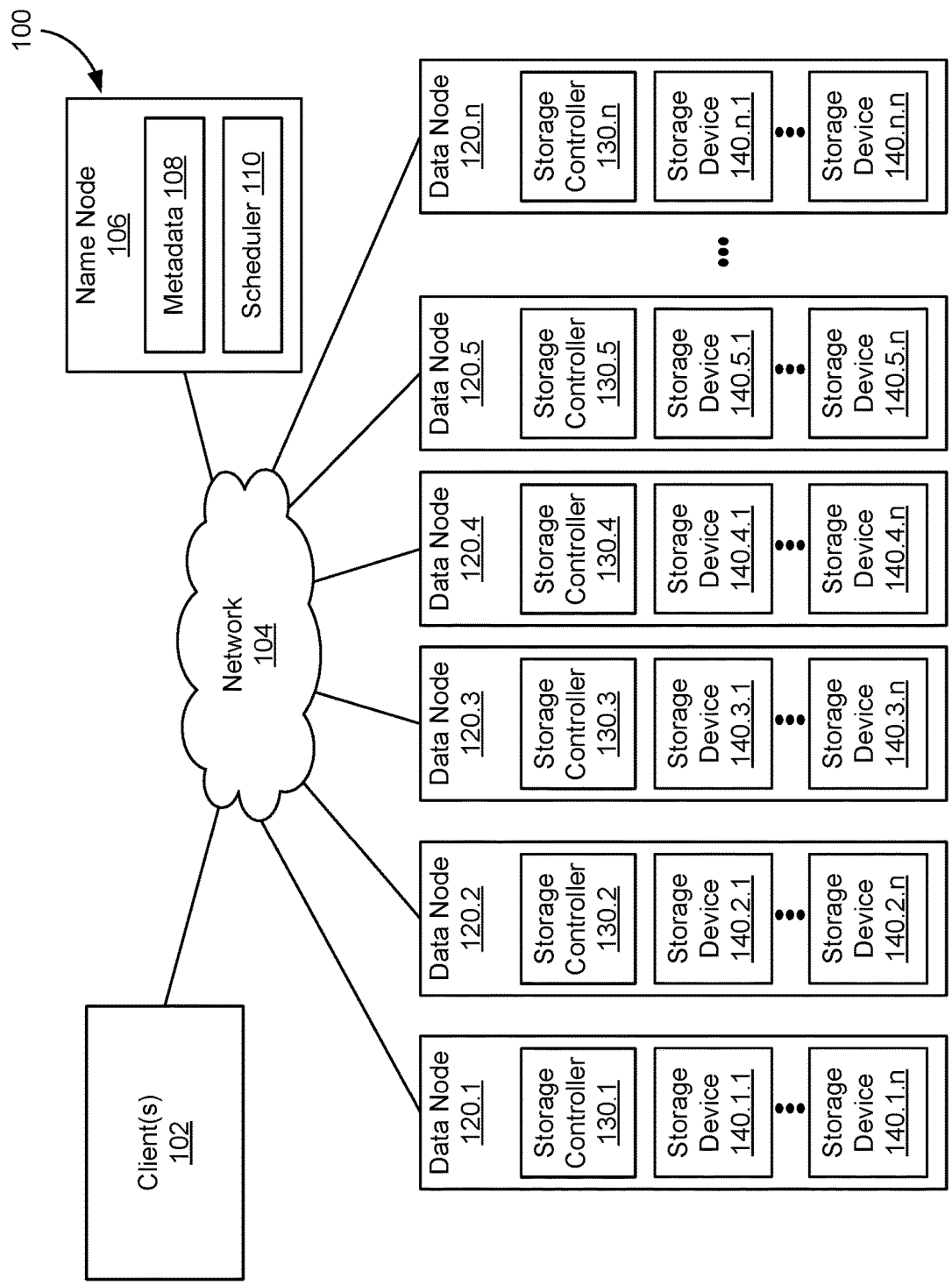
FIG. 1 schematically illustrates a distributed storage and processing system, such as a distributed file system.

FIG. 1 shows an embodiment of an example data storage system 100 with distributed processing capabilities. While some example features are illustrated, various other features have not been illustrated for the sake of brevity and so as not to obscure pertinent aspects of the example embodiments disclosed herein. To that end, as a non-limiting example, data storage system 100 includes one or more data storage devices 140 (also sometimes called information storage devices, storage devices, or disk drives) configured in storage or data nodes 120. In some embodiments, storage or data nodes 120 may be configured as blades, rack servers, storage arrays, or similar storage units for use in data center storage racks or chassis. Data nodes 120 may support one or more clients 102 and provide data storage and retrieval capabilities for client 102. In some embodiments, data nodes 120 may be configured in a distributed storage system that uses one or more name nodes 106 to manage metadata 108 regarding the data stored in data nodes 120. Name node 106 may be responsible for a corresponding set of data nodes and storage devices and provide additional storage management and data processing functions, such as compute task scheduling and assignment.

In the embodiment shown, each data node 120 includes a number of storage devices 140 attached to a network 104. For example, storage devices 140 may include a number of disk drives arranged in a storage array, such as storage devices sharing a common rack, unit, or chassis in a data center. In some embodiments, storage devices 140 may share a backplane network, network switch(es), and/or other hardware and software components for connecting to network 104, name node 106, and/or client 102. For example, a backplane network may include a plurality of physical port connections to data nodes 120, storage controllers 130, and/or storage devices 140 that define physical, transport, and other logical channels for establishing communication with the different components and subcomponents thereof.

In some embodiments, the interconnections among client 102, name node 106, data nodes 120, storage controllers 130, and/or storage devices 140 may be configured as an interconnect fabric 114 supported by a fabric interconnect protocol, such as non-volatile memory express over fabric (NVMe-oF). The physical connections among the components may include one or more Ethernet connections, peripheral computer interface express (PCIe), fibre channel (FC), serial attached small computer storage interface (SAS), etc., as well as combinations thereof, and any backplane network may include a secure subnetwork through various network switches, network interfaces, and similar networking components.

Client 102 may be configured as a computing system supporting one or more applications or modules in an information technology (IT) system for accessing storage system 100 to store, read, or otherwise manage data therein and/or request distributed function processing. In some embodiments, client 102 may run on a computing system, such as a general-purpose computer configured as an application server, a personal computer, a laptop, a tablet, a wireless telephone, a personal digital assistant or any other type of communication device that is able to interface with the storage system 100. In some embodiments, client 102 may include a web-based graphical user interface accessed through a web browser using secure internet protocols for accessing the distributed data processing functions of storage system 100.

In some embodiments, client 102 may initiate processing of large data files or other data units that are distributed in redundant data chunks across data nodes 120 and storage devices 140. Name node 106 may be configured to receive the processing request, identify the data chunks corresponding to the requested data unit and the data nodes and storage devices containing the redundant copies of the data chunks. A scheduler 110 in name node 106 may be configured to select a set of data chunks and corresponding data paths from among the redundant copies to provide a complete set of data chunks for the requested data unit. In some embodiments, scheduler 110 may use estimates of processing time received from data nodes 120 and/or storage devices 140 to make the data chunk and data path selections and assign the set of compute tasks for those data chunks to the respective data nodes 120 and/or storage devices 140.

In some configurations, several data nodes 120 can be grouped together with or without an associated host system, such as data nodes 120.1-120.3 may share a backplane connection and/or subnetwork. For example, these components may be housed in a single rack or chassis with associated backplane interfaces. Similarly, another set of data nodes, such as 120.4-120.n, may be associated with another rack or chassis and another set of networking equipment. These racks may not be required to be located at the same location. They may be geographically dispersed across different data centers. For example, data nodes 120.1-120.3 may be located in a rack at a data center in Europe, data nodes 120-4-120.*n* may be located in a rack at a data center in the USA, and additional data nodes may be located in a rack at a data center in China. Name node 106 may be located at any one of these locations, spread across a plurality of name nodes replicated at each location, or at another location entirely. These racks or chassis may be interconnected by a variety of network architectures and may include multiple network paths, global networks (e.g., internet), private networks, virtual networks, subnetworks, etc. and related networking equipment. These distributed components may be interconnected by network 104.

In some embodiments, the data storage devices 140 are, or include, solid-state drives (SSDs). Each data storage device 140.1.1-140.*n.n* may include a non-volatile memory (NVM) or device controller based on compute resources (processor and memory) and a plurality of NVM or media devices for data storage (e.g., one or more NVM device(s), such as one or more flash memory devices). In some embodiments, a respective data storage device 140 of the one or more data storage devices includes one or more NVM controllers, such as flash controllers or channel controllers (e.g., for storage devices having NVM devices in multiple memory channels). In some embodiments, data storage devices 140 may each be packaged in a housing, such as a multi-part sealed housing with a defined form factor and ports and/or connectors for interconnecting with a backplane network.

In some embodiments, a respective data storage device 140 may include a single medium device while in other embodiments the respective data storage device 140 includes a plurality of media devices. In some embodiments, media devices include NAND-type flash memory or NOR-type flash memory. In some embodiments, data storage device 140 includes one or more hard disk drives (HDDs). In some embodiments, data storage devices 140 may include a flash memory device, which in turn includes one or more flash memory die, one or more flash memory packages, one or more flash memory channels or the like. However, in some embodiments, one or more of the data storage devices 140 may have other types of non-volatile data storage media (e.g., phase-change random access memory (PCRAM), resistive random access memory (ReRAM), spin-transfer torque random access memory (STT-RAM), magneto-resistive random access memory (MRAM), etc.).

In some embodiments, storage controllers 130 may be coupled to respective data storage devices 140 through an interface bus within each data node 120. For example, each storage mode may be configured as a storage blade or similar storage unit comprising a plurality of interface slots for storage devices 140. Storage controllers 130 may include NVMe interface cards with interface ports for NVMe compatible storage devices, such as storage devices with NVMe interfaces and onboard remote direct memory access (RDMA) engines. In some embodiments, storage controllers 130 may be coupled to respective data storage devices 140 through a backplane network. However, in some embodiments, storage controllers 130 may be hosted as a component and/or a subsystem of another component of data storage system 100. For example, in some embodiments, some or all of the functionality of storage controllers 130 may be implemented by hardware and software for defining a protocol-based storage interface executed on one or more compute resources in at least one of data storage devices 140, network 104, and/or physical interfaces or networking components thereof. Storage controllers 130 are sometimes called a controller system, a main controller system, a non-volatile memory express (NVMe) controller, garbage collection (GC) leader, or storage virtualization controller (SVC). In some embodiments, data nodes 120 may include redundant storage controllers 130, such as a master controller and a secondary controller, for accessing the same set of storage devices 140.

In some embodiments, network 104 may include a wired and/or wireless network (e.g., public and/or private computer networks in any number and/or configuration) which may be coupled in a suitable way for transferring data. For example, network 104 may include any means of a conventional data communication network such as a local area network (LAN), a wide area network (WAN), a telephone network, such as the public switched telephone network (PSTN), an intranet, the internet, or any other suitable communication network or combination of communication networks. Data can be transferred between client 102, name node 106 and/or data nodes 120, storage controllers 130, and storage devices 140 by means of a variety of network protocols, including transmission control protocol (TCP), remote direct memory access (RDMA), RDMA over converged Ethernet (RoCE), NVMe over fabric (NVMe-oF), hypertext transfer protocol (HTTP)/representational state transfer (REST) object interfaces, language-specific interfaces such as Microsoft .Net, Python or C, etc. Additionally, such hosts nodes may comprise additional high bandwidth Ethernet ports to interface with the data nodes 120. In some embodiments, HTTP/REST protocols complying with S3 may enable data transfer through a REST application protocol interfaces (API).

Name node 106 may be any suitable computer device, such as a computer, a computer server, a laptop computer, a tablet device, a netbook, an internet kiosk, a personal digital assistant, a mobile phone, a smart phone, a gaming device, or any other computing device with sufficient processing capabilities to store and execute metadata requests and other supported storage management and data processing functions.

In some embodiments, data storage system 100 includes one or more processors, one or more types of memory, a display and/or other user interface components such as a keyboard, a touch screen display, a mouse, a track-pad, and/or any number of supplemental devices to add functionality. In some embodiments, data storage system 100 does not have a display and other user interface components.

In some embodiments, each storage device 140 includes a device controller, which includes one or more processing units (also sometimes called CPUs or processors or microprocessors or microcontrollers) configured to execute instructions in one or more programs. In some embodiments, the one or more processors are shared by one or more components within, and in some cases, beyond the function of the device controllers. Media devices are coupled to the device controllers through connections that typically convey commands in addition to data, and optionally convey metadata, error correction information and/or other information in addition to data values to be stored in media devices and data values read from media devices. Media devices may include any number (i.e., one or more) of memory devices including, without limitation, non-volatile semiconductor memory devices, such as flash memory device(s).

In some embodiments, media devices in storage devices 140 are divided into a number of addressable and individually selectable blocks, sometimes called erase blocks. In some embodiments, individually selectable blocks are the minimum size erasable units in a flash memory device. In other words, each block contains the minimum number of memory cells that can be erased simultaneously (i.e., in a single erase operation). Each block is usually further divided into a plurality of pages and/or word lines, where each page or word line is typically an instance of the smallest individually accessible (readable) portion in a block. In some embodiments (e.g., using some types of flash memory), the smallest individually accessible unit of a data set, however, is a sector or codeword, which is a subunit of a page. That is, a block includes a plurality of pages, each page contains a plurality of sectors or codewords, and each sector or codeword is the minimum unit of data for reading data from the flash memory device.

A data unit may describe any size allocation of data, such as host block, data object, sector, page, multi-plane page, erase/programming block, media device/package, etc. Storage locations may include physical and/or logical locations on storage devices 140 and may be described and/or allocated at different levels of granularity depending on the storage medium, storage device/system configuration, and/or context. For example, storage locations may be allocated at a host logical block address (LBA) data unit size and addressability for host read/write purposes but managed as pages with storage device addressing managed in the media flash translation layer (FTL) in other contexts. Media segments may include physical storage locations on storage devices 140, which may also correspond to one or more logical storage locations. In some embodiments, media segments may include a continuous series of physical storage location, such as adjacent data units on a storage medium, and, for flash memory devices, may correspond to one or more media erase or programming blocks. A logical data group may include a plurality of logical data units that may be grouped on a logical basis, regardless of storage location, such as data objects, files, or other logical data constructs composed of multiple host blocks.

Figure 2:
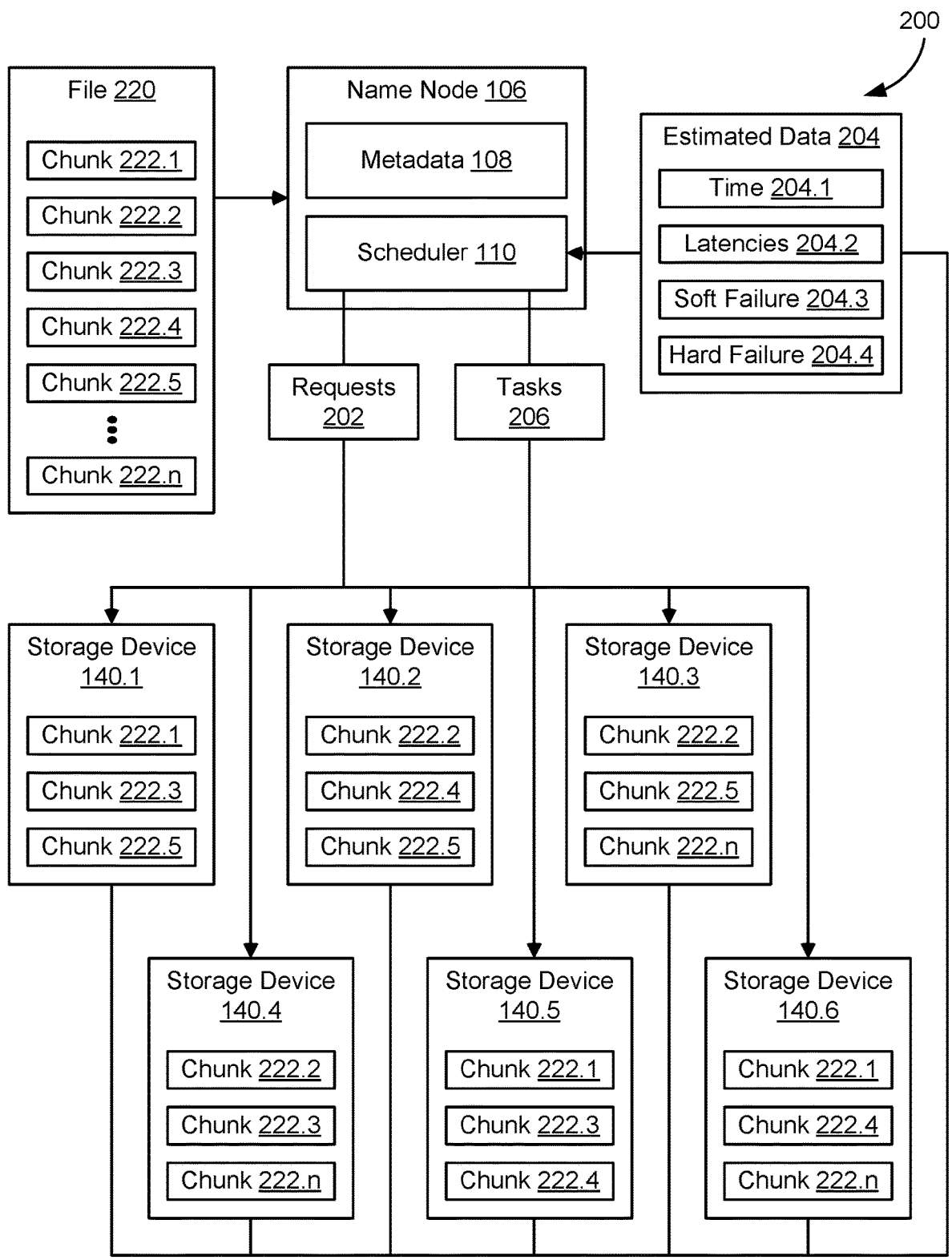
FIG. 2 schematically illustrates an example architecture for processing compute tasks against redundant data chunks that may be used by the system of FIG. 1.

FIG. 2 shows an embodiment of an example architecture 200 for processing compute tasks using redundant data chunks that may be used by the system of FIG. 1. Name node 106 may be configured to receive a request to process a data file 220. Data file 220 may be divided into a set of data chunks 222.1-222.n for storage in storage devices 140. Data chunks 222.1-222.n may be redundantly stored to storage devices 140. For example, three copies of each data chunk may be distributed among storage devices 140, such that each storage device 140.1-140.6 includes three different data chunks 222. Storage device 140.1 may include data chunks 222.1, 222.3, and 222.5. Storage device 140.2 may include data chunks 222.2, 222.4, and a second copy of 222.5. Storage device 140.3 may include a second copy of 222.2, a third copy of 222.5, and 222.n. Storage device 140.4 may include a third copy of 222.2, a second copy of 222.3, and a second copy of 222.n, storage device 140.5 may include a second copy of 222.1, a third copy of 222.3, and a second copy of 222.4, storage device 140.6 may include third copies of 222.1, 222.4, and 222.n. Metadata 108 may include the location information for each copy of each of the data chunks.

When name node 106 receives a processing or storage request for data file 220, it may determine the storage location for each copy of each of data chunk 222.1-222.n for data file 220 using metadata 108. For example, scheduler 110 may be configured with logic to use a file identifier for data file 220 as an index to a metadata table (in metadata 108) that identifies each data chunk corresponding to any portion of data file 220. Each file data chunk may have a unique data block identifier to enable metadata 108 to identify which portion of data file 220 it contains and to assist with reassembly of data file 220, such as by providing a data block order. Scheduler 110 may be configured to identify each redundant copy of each data chunk by the corresponding storage device identifier, data node identifier, and/or other data path or storage location information. For example, scheduler 110 may identify that copies of data chunk 222.1 are stored in storage device 140.1, 140.5, and 140.6, copies of data chunk 222.2 are stored in storage device 140.2, 140.3, and 140.4, etc.

Scheduler 110 may be configured to select a complete set of data chunks 222.1-222.n for data file 220. The complete set of data chunks may be used to initiate and, ideally, complete retrieval and processing of data file 220. In some embodiments, processing of data file 220 may be executed by compute processing resources at the data node and/or storage device containing the respective data chunks. In this way, transfer of data may be limited and time, bandwidth, and other resources may be conserved. For such processes, the complete data file 220 may not need to be reassembled in a single location and the results of a set of compute tasks targeting the portions of data file 220 in data chunks 222.1-222.n may be all that is transferred back to the client.

In some configurations, different storage devices 140 and/or their corresponding data nodes may not have the same processing capabilities, reliability, bandwidth, etc. The set of storage devices and corresponding data chunks selected by scheduler 110 may have a significant impact on the processing time and, therefore, the overall performance of storage system 100 for the retrieval and processing of data file 220. Scheduler 110 may be configured to use estimated task times for each data chunk and storage device combination, sometimes referred to as a storage path, to determine which set of data chunks for data file 220 would be most efficient and/or meet a desired processing time threshold.

For example, scheduler 110 may send an estimate request 202 to each storage device 140 that contains a data chunk 222.1-222.n for data file 220. Estimate requests 202 may follow the storage paths to the respective storage devices 140 and storage devices 140 and/or their respective data nodes may provide estimated processing data 204 back to scheduler 110. For example, each storage device 140.2 may use a combination of historical and real-time operations data to estimate one or more values that impact processing time and format those values in a response message to scheduler 110. Scheduler 110 may use estimated processing data 204 from each storage device 140 for each data chunk 222 (and related data path) to evaluate different combinations of data chunk assignments. For example, scheduler 110 may determine a total task time estimate for each data path and evaluate different combinations of data chunk assignments to process a complete set of data chunks. Each storage device 140 and/or data node may be configured to retrieve and process data chunks independent of other storage devices and/or data nodes, allowing parallel processing of compute tasks assigned to different nodes. In some embodiments, scheduler 110 may evaluate the different combinations in an attempt to keep the total processing time for each storage device used under a target processing time for the parallel processing of all selected data chunks. Responsive to selecting the set of data chunks and corresponding data paths to be used for processing file data for data file 220, scheduler 110 may issue assigned compute tasks 206 to storage devices 140 and/or their respective data nodes.

In some embodiments, estimated processing data 204 may include processing time 204.1, latencies 204.2, soft failure 204.3, and/or hard failure 204.4. For example, processing time 204.1 may include the base processing time for the compute task based on the data chunk size, processing capability, and other factors related to the time required for actively processing the data chunk. Different function processors may have different processing speeds and other compute resources that impact the rate at which they can process a give compute task. Latencies 204.2 may include delays related to transferring data and waiting for compute and storage resources. Latencies 204.2 may include estimated delays based on network traffic, data transfer bandwidth, task queues, and other possible delays surrounding the active processing of compute tasks.

Soft failures 204.3 may include the estimated likelihood and/or number of correctable errors expected in the data retrieval process. Soft failures may relate to error correction codes (ECC) and/or retry loops for successfully reading data chunks. A number of soft failures may correlate to delays in the retrieval and/or processing of the compute tasks. In some embodiments, a worst-case estimate of soft failures based on operations data for the storage device may be used to determine the possible increase in processing time due to soft failures.

Hard failure 204.4 may include an estimated likelihood that the target storage device will not be able to fetch or recover the requested data for processing. For example, a storage device that has failed or is offline may have a hard failure likelihood of 100% and a storage device running at peak reliability may have an effective failure likelihood of less than 1% (which may effectively be treated as 0). A storage device that has been experiencing unrecoverable errors, is reaching the end of its endurance, or has other operating factors suggesting lower reliability, may have other values for hard errors.

In some embodiments, scheduler 110 may be configured to receive estimated processing data 204 and evaluate the received estimated values to determine a likely or worst-case total processing time. For example, scheduler 110 may include logic and one or more algorithms for converting estimated processing data 204 into processing time and/or delay time and summing the results for a total estimated task time for each compute task and data path. In some embodiments, storage devices 140 and/or their respective data nodes may include the logic for calculating the total estimated task time from estimated processing data 204 and return only the total estimated task time for use by scheduler 110.

Figure 3:
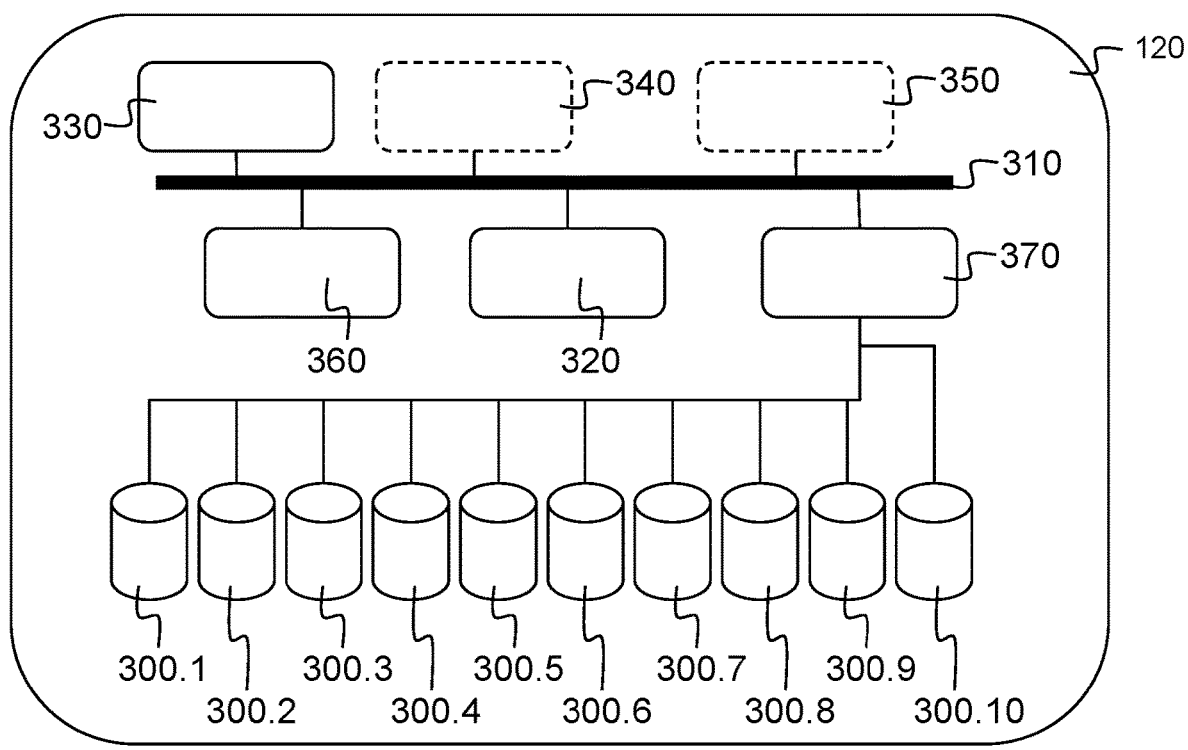
FIG. 3 schematically illustrates a storage or data node of the system of FIG. 1.

FIG. 3 shows a schematic representation of an example data node 120. Data node 120 may comprise a bus 310, a processor 320, a local memory 330, one or more optional input units 340, one or more optional output units 350, a communication interface 360, a storage element interface 370 and a plurality of storage elements 300.1-300.10. In some embodiments, at least portions of bus 310, processor 320, local memory 330, communication interface 360, storage element interface 370 may comprise a storage controller or backplane management controller, such as storage controllers 130. Bus 310 may include one or more conductors that permit communication among the components of data node 120. Processor 320 may include any type of conventional processor or microprocessor that interprets and executes instructions. Local memory 330 may include a random-access memory (RAM) or another type of dynamic storage device that stores information and instructions for execution by processor 320 and/or a read only memory (ROM) or another type of static storage device that stores static information and instructions for use by processor 320. Input unit 340 may include one or more conventional mechanisms that permit an operator to input information to said data node 120, such as a keyboard, a mouse, a pen, voice recognition and/or biometric mechanisms, etc. Output unit 350 may include one or more conventional mechanisms that output information to the operator, such as a display, a printer, a speaker, etc. Communication interface 360 may include any transceiver-like mechanism that enables data node 120 to communicate with other devices and/or systems, for example mechanisms for communicating with other data nodes 120 or name nodes 106 such as for example two 1 gigabit (Gb) Ethernet interfaces. Storage element interface 370 may comprise a storage interface, such as a Serial Advanced Technology Attachment (SATA) interface, a Small Computer System Interface (SCSI), peripheral computer interface express (PCIe), etc., for connecting bus 310 to one or more storage elements 300, such as one or more storage devices 140, for example, 2 terabyte (TB) SATA-II disk drives or 2 TB NVMe solid state drives (SSDs), and control the reading and writing of data to/from these storage elements 300. As shown in FIG. 3, such a data node 120 could comprise ten 2 TB SATA-II disk drives as storage elements 300.1-300.10 and in this way data node 120 would provide a storage capacity of 20 TB to the storage system 100.

Storage system 100 may comprises a plurality of storage elements 300. Data nodes 120 may each comprise a share of these storage elements 300. Each data node 120 could comprise a similar amount of storage elements, but this is, however, not essential. Data node 120 could for example comprise four, eight, ten, or any other number of storage elements appropriate to interface and form factor constraints. Storage system 100 may be operable to store and retrieve a data objects, data blocks, data files, or other data units comprising data, for example, 64 MB of binary data and a location or object identifier for addressing this data unit, for example a universally unique identifier such as a globally unique identifier (GUID).

Storage elements 300 may be configured as redundant or operate independently of one another. In some configurations, if one particular storage element 300 fails its function can easily be taken on by another storage element 300 in the storage system. Furthermore, the independent operation of the storage elements 300 allows to use any suitable mix of types of storage elements 300 to be used in a particular storage system 100. It is possible to use for example storage elements with differing storage capacity, storage elements of differing manufacturers, using different hardware technology such as for example conventional hard disks and solid-state storage elements, using different storage interfaces such as for example different revisions of SATA, SAS, FC, NVMe, and so on. All this results in specific advantages for scalability and flexibility of storage system 100 as it allows to add or remove storage elements 300 without imposing specific requirements to their design in correlation to other storage elements 300 already in use in that storage system 100.

Figure 4:
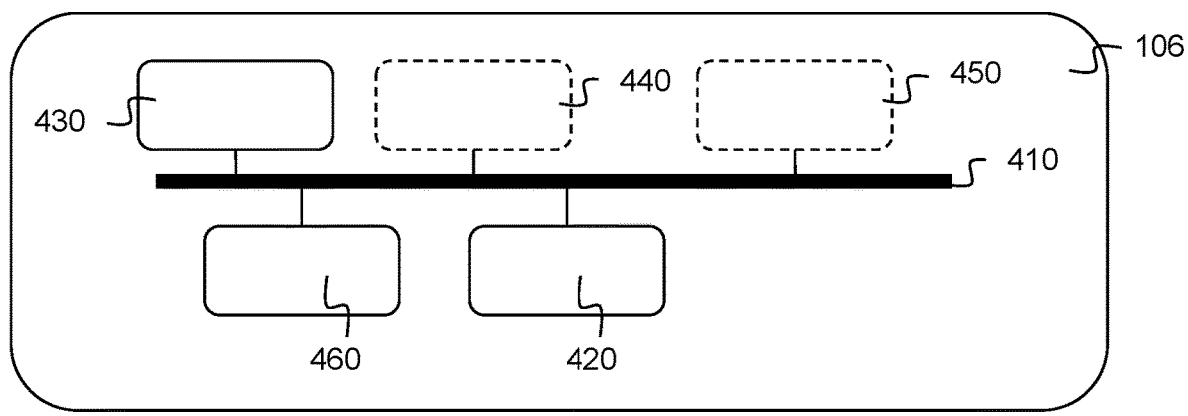
FIG. 4 schematically illustrates a host, client, or name node of the distributed storage system of FIG. 1.

FIG. 4 shows a schematic representation of example client nodes 102 and/or name nodes 106. Name node 106 may comprise a bus 410, a processor 420, a local memory 430, one or more optional input units 440, one or more optional output units 450, and a communication interface 460. Bus 410 may include one or more conductors that permit communication among the components of name node 106. Processor 420 may include any type of conventional processor or microprocessor that interprets and executes instructions. Local memory 430 may include a random access memory (RAM) or another type of dynamic storage device that stores information and instructions for execution by processor 420 and/or a read only memory (ROM) or another type of static storage device that stores static information and instructions for use by processor 420 and/or any suitable storage element such as a hard disc or a solid state storage element. An optional input unit 440 may include one or more conventional mechanisms that permit an operator to input information to said name node 106 such as a keyboard, a mouse, a pen, voice recognition and/or biometric mechanisms, etc. Optional output unit 450 may include one or more conventional mechanisms that output information to the operator, such as a display, a printer, a speaker, etc. Communication interface 460 may include any transceiver-like mechanism that enables name node 106 to communicate with other devices and/or systems, for example mechanisms for communicating with data nodes 120, other name nodes 106, or client nodes 102 such as for example two 10 Gb Ethernet interfaces.

Figure 5:
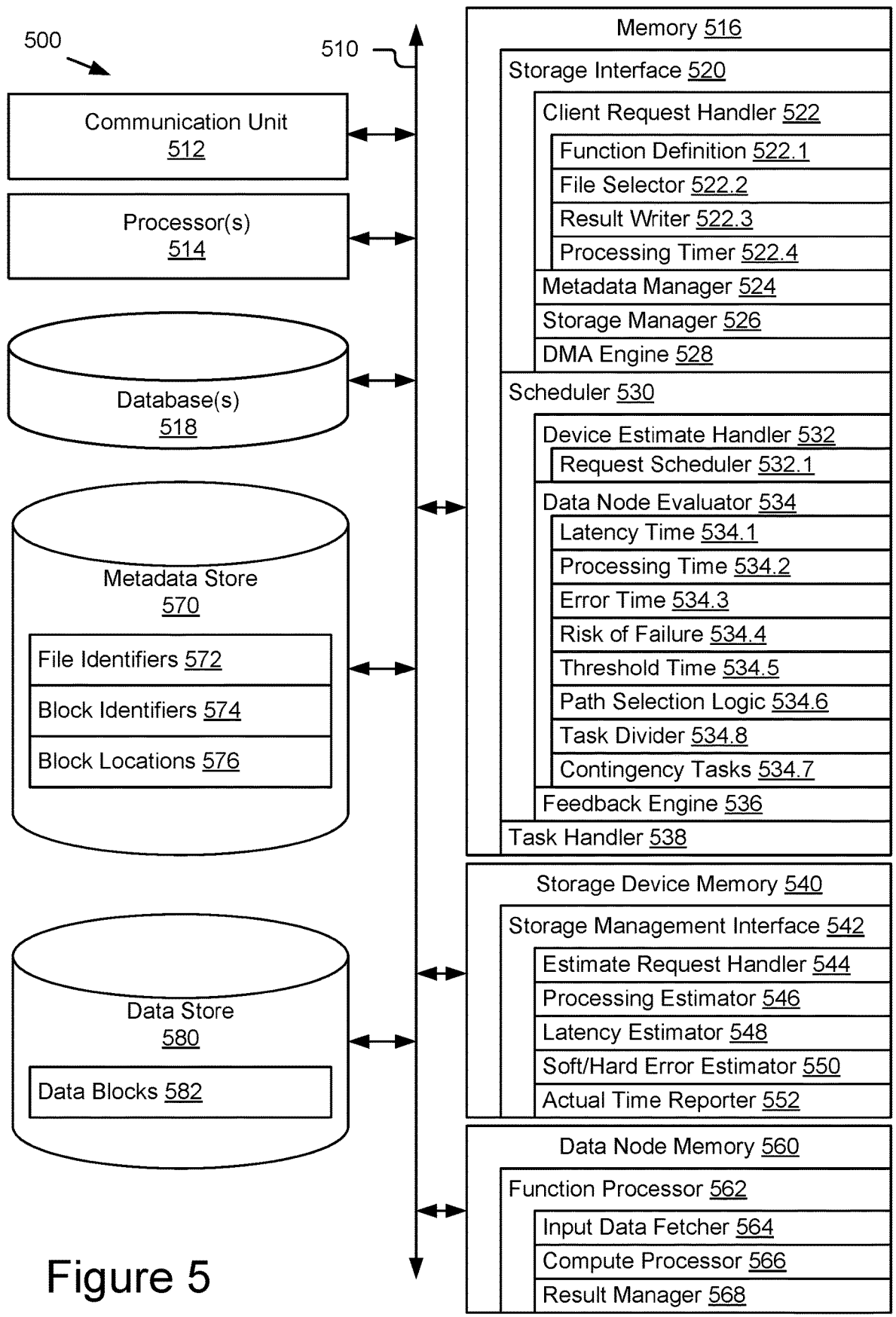
FIG. 5 schematically illustrates some elements of the systems of FIGS. 1-4 in more detail.

FIG. 5 schematically shows selected modules of a name node, data node, and/or storage device configured to use estimated task times to assign copies of redundant data chunks for use in data file processing. Storage system 500 may be configured as a group of nodes with an architecture and/or hardware similar to name node 106 and/or data node 120. Storage system 500 may incorporate elements and configurations similar to those shown in FIGS. 1-4. For example, storage system 500 may be configured to include a name node 106 or similarly configured host node with a host controller for executing the functions in memory. In some embodiments, storage interface 520, scheduler 530, task handler 538 storage management interface 542, and/or function processor 562 may be embodied in any combination of host nodes configured as name nodes 106 and/or data nodes 120, as well as their respective storage devices or storage controllers.

Storage system 500 may include a bus 510 interconnecting at least one communication unit 512, at least one processor 514, and at least one memory 516. Bus 510 may include one or more conductors that permit communication among the components of storage system 500. In some embodiments, bus 510 may represent a plurality of busses interconnecting different device memories (e.g., memory 516, storage device memory 540, and/or data node memory 560) with corresponding processors 514 and communication units 512. Communication unit 512 may include any transceiver-like mechanism that enables storage system 500 to communicate with other devices and/or systems. For example, communication unit 512 may include wired or wireless mechanisms for communicating with client nodes, host nodes, other name nodes or storage nodes, and/or one or more other storage systems or components, such as storage controllers. Processors 514 may include any type of processor or microprocessor that interprets and executes instructions. Memory 516 may include a random access memory (RAM) or another type of dynamic storage device that stores information and instructions for execution by processor 514 and/or a read only memory (ROM) or another type of static storage device that stores static information and instructions for use by processor 514 and/or any suitable storage element such as a hard disc or a solid state storage element. In some embodiments, processors 514 and memory 516 may include a plurality of distinct compute resources associated with a client or host system and subcomponents thereof, where each component or subcomponent includes its own processor and memory resources. In some embodiments, at least a portion of bus 510, communication unit 512, processor 514, and memory 516 may be configured in a host controller, such as a host controller in name node 106.

Storage system 500 may include or have access to one or more databases 518 and/or specialized data stores, such as metadata store 570 and file data store 580. Databases may include one or more data structures for storing, retrieving, indexing, searching, filtering, etc. of structured and/or unstructured data elements. Metadata store 570 may include metadata information describing and relating to the data files stored in data store 580. For example, metadata store 570 may include indexed storage location information for data files, such as data file identifiers 572, data block identifiers 574, and block locations 576. Host data store 580 may include data files stored for access and processing by data nodes. For example, host data store 580 may include data blocks 582 corresponding to data files and redundantly distributed across storage devices supporting data store 580. Data blocks 582 may have been stored through storage interface 520 and/or may have been stored through another storage interface into data store 580. In some embodiments, data blocks 582 may correspond to portions of data files, objects, or other addressable data units. In some embodiments, data store 580 may be organized in namespaces with defined read and write access privileges and content or function. For example, each namespace may identify a configuration of nodes, users, owners, etc. with access privileges, authentication information, and specific read, write, delete, and similar types of access limitations. In some embodiments, namespaces 588 may be used to separate and provide different access configurations to data files and corresponding data blocks 582 to support distributed retrieval and processing.

Storage system 500 may include a plurality of modules or subsystems that are stored and/or instantiated in memory 516 for execution by processor 514. For example, memory 516 may include a storage interface 520 configured to receive, process, and respond to data and/or function requests from client applications, other host systems, and/or other nodes in storage system 100. Memory 516 may include a scheduler 530 configured to determine data blocks corresponding to a processing request and assign retrieval and processing compute tasks to specific copies of the data blocks. Memory 516 may include a task handler configured to send and manage the compute tasks assigned by scheduler 530.

Storage interface 520 may include an interface protocol or set of functions and parameters for storing, reading, and otherwise managing data requests to data store 590. For example, storage interface 520 may include functions for reading, writing, modifying, or otherwise manipulating data blocks, objects, and/or files, as well as their respective client or host data and metadata in accordance with the protocols of an object, block, file, or other storage system. In some embodiments, storage interface 520 may further enable execution of data operations for data store 580 and/or metadata store 570. For example, storage interface 520 may include protocols and/or interfaces for receiving data processing requests that may define functions, target data sets, and/or result formatting and delivery, as well as executing those functions against data store 580.

In some embodiments, storage interface 520 may include a plurality of hardware and/or software modules configured to use processor 514 and memory 516 to handle or manage defined operations of storage interface 520. For example, storage interface 520 may include a client request handler 522, a metadata manager 524, a storage manager 526, and a direct memory access (DMA) engine. For any given client request, storage interface 520 may receive a client request through client request handler 522 and determine one or more operations based on the content of the request. These operations may include metadata operations handled by metadata manager 524 and/or data operations handled by storage manager 526, including encoding and decoding operations. In some embodiments, data processing operations may be handled by storage interface 520 by calling one or more other modules, such as scheduler 530, task handler 538, and/or function processor 562. The results of these operations may be processed, formatted, and returned by client request handler 522. DMA engine 528 may support access to namespaces in data store 580 for supporting storage manager 526, storage management interface 542, and/or function processor 562.

Client request handler 522 may include an interface and/or communication event-based condition for receiving data requests and/or operational commands from one or more clients or applications. For example, client systems may send a data request over a network connection and addressed to storage system 500 or a port or component thereof. Client request handler 522 may receive these requests and parse them according to the appropriate communication and storage protocols. For example, client request handler 522 may identify a transaction identifier, a client identifier, an object or location identifier (LBA, file name, object name, GUID, etc.), a data operation, and additional parameters for the data operation, if any, from the received message or messages that make up the data request. Similarly, operational commands may include syntax and parameters for accessing data stored according to a specific block or file system. Operational commands may also relate to the execution of data functions by storage system 500.

In some embodiments, client request handler 522 may be configured for managing data operations to be executed by storage system 500. For example, a client system may be able to define one or more data functions, such as a map-reduce process, to be executed against a data set stored in data store 580 without transferring the data set to the client system (i.e., executing the host function on the data in the storage nodes close to the host node and only transferring the results to the client system). In some embodiments, data previously stored in data store 580 may be processed through at least one function (in a set of functions) by the storage node and/or storage device storing the target data blocks. For some host function request, an intermediate context may be generated and further processed within the storage node without returning the intermediate data to the client system or sending it to another host node.

Client request handler 522 may include one or more operations for managing data operation requests from a client system. For example, upon receiving a function request or command that relates to a data operation, client request handler 522 may identify the management operation and/or parse the components of a complete data function operation. In some embodiments, a complete data operation request may include request parameters for a function definition, a target data set, and a result format. Client request handler 522 may include a function definition module 522.1, a data set selector 522.2, a result writer 522.3, and/or processing timer 522.4 for identifying, determining, or otherwise parsing the parameters of the data operation request. In some embodiments, the request parameters may be passed to scheduler 530 and/or task handler 538 for managing the sharing of map compute tasks and/or reduce compute tasks related to the function request.

In some embodiments, function definition module 522.1 may include an interface, function, or logic to receive and/or determine the set of functions to be used in a set of compute tasks for the data function operation. For example, the set of functions may include a function or set of parameters that may be applied to a subunit identification function for identifying data subunits. Example subunit identification functions might include logic for identifying sentences within a block of text, a frame of data within a video image file, or a shape within a graphics file. In some embodiments, a subunit identification function may include a set of subunit parameters that define the portions of a data unit that should be treated as a subunit for the purposes of the set of functions. The set of functions may include a map-function, which may provide logic for operating on a subunit to determine an intermediate context for that subunit. For example, the map-function may count the nouns in a sentence, the faces in a frame of video, or the vertices in a shape and return a numeric value or type-value pair for each parameter of the subunit being determined by the map-function. A map-function may be a parallel-function that allows each subunit to be processed independently or a serial-function where each intermediate context provides one or more values for use in applying the serial-function to the next subunit. The set of functions may include a reduce-function, which provides logic for providing an aggregate or result value for the intermediate contexts determined for each subunit. The set of functions may also include terminal conditions, such as values or parameters to seed another function (e.g., a map or reduce function) or conditions signalling a final subunit and a result-function. In some embodiments, function definition module 522.1 may include an API or user interface for receiving selections of function types and parameters and may be sent from a client system.

In some embodiments, file selector 522.2 may include an interface, function, or logic to receive and/or determine target data set to be processed using the set of functions for a particular data operation. For example, file selector 522.2 may define the bounds of a set of data using any physical or logical grouping appropriate to the particular set of functions, such as a target data file. File selector 522.2 may be configured for the type of data stored in data store 580 and/or the metadata from metadata store 570 that may be used to index the data. For example, file selector 522.2 may be able to target a data file, a set of data files defined by some selection criteria, an inode or other logical volume, or a similar set of parameters for defining data of interest. In some embodiments, file selector 522.2 may define a total data set comprised of a plurality of data units, such as files, objects, or messages within the total data set. The plurality of data units may each be comprised of a plurality of subunits that may be the target of defined functions, such as map-functions. In some embodiments, file selector 522.2 may include an API or user interface for receiving selections of data set parameters or identifiers that may be sent from a client system.

In some embodiments, result writer 522.3 may include an interface, function, or logic to receive and/or determine the format of the results to be returned to a requesting system, such as a client or host system. For example, result writer 522.3 may receive the result output from applying the set of functions to the target data file and format in accordance with the preferences of the requesting system, such as simplifying results to a fixed value, delta value, array of values, file, object, metadata table, etc. In some embodiments, a map-reduce function set may return a final reduce-result in a defined format. For example, the map-reduce function set may return a total number of words, sentences, and paragraphs in a large text file or text object for novel by formatting three numeric values preceded by appropriate tags in accordance with a defined syntax, such as comma separated values. A result may be returned for the total data set. In some embodiments, the result formatter may include parameters for a host distributed file write to return the results to the function requester and/or initiate a replication or other data management process. In some embodiments, result writer 522.3 may include an API or user interface for returning result values to a client system.

In some embodiments, processing timer 522.4 may include an interface, function, or logic to receive and/or determine a requested processing time for the function or other processing request and monitor the actual processing time against the requested processing time. For example, the function request may include a time parameter for the processing time allotted to the function request in order to meet desired service levels and/or coordinate with parallel or concurrent processing of function requests on other host nodes. In some embodiments, a target processing time may be a configuration parameter for storage system 500 and/or components thereof. For example, a service level or system configuration may determine the amount of time allocated to processing recurring processing requests, which may be scaled based on target file size or similar parameters. In some embodiments, processing timer 522.4 may also track the actual time from receipt of the processing request to delivery of the request results for monitoring and managing system performance and/or compliance with service levels.

Metadata manager 524 may include interfaces, functions, and/or parameters for creating, modifying, deleting, accessing, and/or otherwise managing object, block, or file metadata, such as metadata stored in metadata store 570 and/or data store 580. For example, when a new file, block, or object is written to data store 580, at least one new metadata entry may be created in the metadata store to represent parameters describing or related to the newly created data unit. Metadata manager 524 may generate and maintain metadata that enables metadata manager 524 to locate file, block, and/or object metadata within the metadata store, including redundant copies of data blocks or other data chunks. In some embodiments, metadata manager 524 may also manage metadata stored in data store 580 with the data objects, blocks, or files, such as metadata tags or headers. Metadata manager 524 may work in conjunction with storage manager 526 to create, modify, delete, access or otherwise manage metadata stored as tags or headers within data store 580.

Storage manager 526 may include interfaces, functions, and/or parameters for reading, writing, and deleting data units in data store 580. For example, PUT or write commands may be configured to write host data units to data store 580. GET or read commands may be configured to read data from data store 580. DELETE commands may be configured to delete data from data store 580, or at least mark a data object for deletion until a future garbage collection or similar operation actually deletes the data or reallocates the physical storage location to another purpose. In some embodiments, data files may be stored in data blocks 582 in data store 580 and storage operations to the data nodes or storage devices may be managed at the data block level.

Other storage commands may be handled by storage manager 526. Storage commands processed by storage manager 526 may include parameters for accessing special functions and/or metadata resources stored with host or client data. Storage manager 526 may work in conjunction with metadata manager 524 for managing metadata, including versioning information. In erasure encoded systems, storage manager 526 may operate in conjunction with encoders, block spreaders, block clusters, and decoders for encoding and decoding data objects in redundant and distributed data blocks in accordance with an erasure coding configuration or other data redundancy method. For example, storage manager 526 may use an encoder and block spreader to write data to data store 580 and use a block clusterer and decoder to read data from data store 580.

DMA engine 528 may include logic, protocols, and/or interfaces for providing direct memory access to memory using a defined DMA protocol, such as remote direct memory access (RDMA). RDMA protocols may enable data movement directly between fabric nodes, such as storage devices, storage interface controllers, and host nodes without higher-level data routing. RDMA protocols may be employed over fabric networks using Ethernet, fibre channel, and similar network technologies to enable DMA engine 528 to expose, allocate, and manage selective access to the buffer memory within a given storage device from fabric nodes outside of the storage device, such as peer storage devices. In some embodiments, DMA engine 528 may incorporate iWARP, RDMA over converged Ethernet (RoCE), or other RDMA standards.

Scheduler 530 may include a set of interfaces, functions, parameters, and data structures for enabling a storage subsystem, such as a name node, to manage data retrieval and processing allocation for a given processing request. For example, scheduler 530 may allow a name node to receive estimated processing data and coordinate efficient sharing of compute tasks across the data blocks for a target data file. In some embodiments, scheduler 530 may be configured to find an optimal set of assignments for parallel retrieval and processing of all data blocks for a large data file. Scheduler 530 may evaluate the compute tasks for the processing request and determine the allocation of retrieval and compute tasks across storage devices, particularly comparing options among redundant copies of each data chunk.

In some embodiments, scheduler 530 may include a plurality of hardware and/or software modules configured to use processor 514 and memory 516 to handle or manage defined operations of scheduler 530. For example, scheduler 530 may include a device estimate handler 532, a data node evaluator 534, and a task handler 538.

Device estimate handler 532 may include data structures, functions, and interfaces for generating estimate requests to the storage devices and/or data nodes that include data chunks for a target data unit, such as a data file, as well as receiving estimate responses from the storage devices and/or data nodes. For example, device estimate handler 532 may generate, responsive to a processing request, on a periodic basis, or timed to coincide with the completion of a prior processing request, an estimate request to each data node and/or storage device that includes at least one data block or data chunk for the target data file. In some embodiments, device estimate handler 532 may be configured to collect data processing estimates from the data nodes and storage devices in response messages from the estimate requests. In some embodiments, data nodes and/or storage devices may be configured to periodically provide processing estimate data to device estimate handler 532. Device estimate data may include a variety of processing estimate parameters, such as processing time, latency, and error data, and not all device estimate data may be collected in the same way. For example, latency data may be provided responsive to changes in network conditions, error data may be provided responsive to error events or error thresholds in the corresponding storage device, and processing time may be responsive to the estimate requests for a specific target data block and processing function. In some embodiments, device estimate handler 532 may pass one or more processing estimate data parameters for a target processing task, data file, data chunk, and storage path to data node evaluator 534.

In some embodiments, device estimate handler 532 may be configured to use compute and network resources that do not interrupt or extend processing time for requested processing tasks. For example, device estimate handler 532 may include a request scheduler 532.1 for estimate requests that targets the window between completion of retrieval and compute tasks for a prior data file processing operation and a next data file processing operation that has been requested (but not yet assigned and initiated). In some embodiments, client request handler 522 may generate a queue of processing requests that correspond to a series of data file retrieval and processing operations. While file data for one file is being processed by the storage devices and/or data nodes, the next processing request and target data file is known from the processing request queue. Request scheduler 532.1 may use the processing period for the prior processing request and corresponding set of compute tasks to issue the device estimate requests and receive resulting processing estimate data. For example, request scheduler 532.1 may initiate estimate requests a fixed time before the estimated completion of the prior processing period, based on either the estimated total task time of the longest compute task in the prior set of compute tasks or the requested processing time for completing the processing request. In some embodiments, request scheduler 532.1 may prioritize estimate requests to each storage device according to the estimated task time for each storage device, such that the storage devices and/or data nodes expected to complete their compute tasks first are the first to receive the estimate requests for the next processing request.

Data node evaluator 534 may include data structures, functions, and interfaces for evaluating how compute tasks for a set of data chunks, such as the data blocks corresponding to a data file, may be allocated across available data nodes and/or storage devices. For example, data node evaluator 534 may use estimated latency time 534.1, processing time 534.2, and/or error time 534.3 to determine a total estimated task time for each data chunk and each storage device, data node, and corresponding data path for reaching each redundant copy of the data chunk in data store 580. The total estimated task time for each data chunk may allow data node evaluator to organize and rank options for processing each data chunk and selecting the best combination of options. For example, data node evaluator 534 may organize the data chunks and their corresponding estimated task times by the data nodes through which they are accessed and processed and rank them from least time to greatest time.

In some embodiments, an estimated risk of failure 534.4 may be received or determined by data node evaluator 534 and used to eliminate or deprioritize storage devices and/or data nodes with a high risk of failure. For example, estimated risk of failure values for each data path may be determined from hard error values received from the storage devices and compared to a risk threshold. Data paths exceeding the risk threshold may be eliminated from consideration and/or have a risk factor added to their estimated task time that makes them unlikely to be selected as the best source of a particular data chunk.

In some embodiments, a threshold time 534.5 may be received or determined by data node evaluator 534 and used to evaluate whether parallel processing of selected data paths will meet time threshold 534.5. For example, the processing request and/or configuration of system 500 may provide a target or requested processing time in which a processing request for a data file should be completed, such as to support coordination with other systems or meet desired or contractual service levels. Data paths that exceed the threshold time may be eliminated and/or identified as candidates for contingency tasks 534.7 and/or task divider 534.8.

In some embodiments, data node evaluator 534 may include a path selection logic 534.6 configured to use two or more of estimated latency time 534.1, processing time 534.2, error time 534.3, risk of failure 534.4, and/or threshold time 534.6 to determine which redundant data chunks and their respective data paths should be selected. For example, path selection logic 534.6 may use the total task time estimates for each data path to evaluate the different combinations for selecting data chunks and assigning compute tasks. For example, once total task time estimates are ranked, it may result in conflicts were the shortest processing time for two different data chunks may be through the same data node and would render parallel processing impossible. Therefore, different combinations may be evaluated by path selection logic 534.6 to determine which sets of data path assignments provide the shortest total task time across all compute tasks. For example, assuming each data node has a plurality of associated storage devices and data chunks and that the desired level of parallelism is one compute task processed by each data node, path selection logic 534.6 may evaluate each combination to determine which combination assigns a single compute task for a corresponding data chunk to each data node. Even though node A may be the fasted option for chunks 1, 3, and 5, it can only be assigned one of them. Chunk 3 may be assigned to node D and chunk 5 may be assigned to node C, because they are the next best options (that also balance the competing data nodes for the other chunks they contain).

In some embodiments, path selection logic 534.6 may use threshold time 534.5 for evaluating the combinations of data path assignments and determining whether threshold time 534.5 is met. For example, data node evaluator 534 may determine the shortest parallel task time from the various combinations of total task times for each set of data paths for the data file and determine whether at least one set of data paths meets threshold time 534.5. If threshold time 534.5 is met (the greatest total task time among the set of parallel data paths is less than or equal to threshold time 534.5), one of the sets of data paths meeting the threshold time may be selected. If none of the sets of data paths for processing the data file meet threshold time 534.5, then data node evaluator 534 may include additional logic for modifying compute task assignments. For example, path selection logic 534.6 may evaluate whether compute tasks may be stacked for a data node that has multiple corresponding data chunks with low total task times that would allow it to complete multiple tasks within threshold time 534.5. In some embodiments, consideration of multiple compute tasks being handled by a single data node may be considered in the combinations of sets of parallel data paths in path selection logic 534.6.

In some embodiments, data node evaluator 534 may include a task divider 534.8 to determine additional options for assigning sets of parallel compute tasks. Task divider 534.8, may enable data node evaluator 534 to divide data chunks and compute tasks into two or more portions and split them among data nodes that include redundant copies of the target data chunk. For example, node A may include chunks 1, 3, and 5 and be able to complete the compute tasks for all of chunk 1 and half of chunk 3 within the threshold time. Node D may be slow for some reason, but contains chunk 3 and could complete half of it within the threshold time. Task divider 534.8 may divide data chunk 3 and the corresponding retrieval and compute task in half and assign the two portions to node A and node D respectively. This may provide path selection logic 534.6 with additional options for assigning sets of data chunks for parallel processing across the data nodes.

In some embodiments, data node evaluator 534 may include contingency tasks 534.7 for redundantly assigning the same task to two data paths and using whichever generates a result first. For example, where two or more data nodes include redundant copies of a data chunk and both have estimated total task times that are over or near threshold time 534.5 (and neither are needed for processing another compute task), they may both be assigned the same compute task and target data chunk. This may be particularly effective where the total task time for one or both has a high level of uncertainty due to estimated error time 534.3 and/or risk of failure 534.4. In some embodiments, task handler 538 may be notified of the parallel assignments of the same compute task and configured to select only the first result received for coordinating processing results.

Feedback engine 536 may include data structures, functions, and interfaces for receiving actual time data related to retrieving data chunks and processing corresponding compute tasks, comparing the actual times to the estimated times received by device estimate handler 532, and providing feedback to estimators in the data nodes and/or storage devices. For example, each time a compute task is completed, feedback engine 536 may receive actual time data from the storage device and/or data node that completed the data retrieval and/or compute task. The actual time data may be compared to one or more estimates in the estimated processing data received by device estimate handler 532 from the storage device and/or data node. Feedback engine 536 may compare the actual time data values to estimated time values to determine variances between actual and estimated values. Based on any variances determined, such as variances exceeding an estimate accuracy threshold, a correction factor may be calculated and sent to the storage device and/or data node.

Task handler 538 may include data structures, functions, and interfaces for sending compute tasks to the selected data nodes and storage devices along the selected data paths. For example, scheduler 530 may generate a list of compute task assignments for the set of data chunks corresponding to a target data file. The compute task assignments may specify a data chunk, such as by providing a data block identifier, and a data path specified by a target storage device containing the data chunk, such as a storage device identifier and/or storage location. In some embodiments, the processing portion of the compute task may also be specified by a process identifier or similar parameter and/or a function definition may be included in the processing request and redistributed by task handler 538. In some embodiments, task handler 538 may send a compute task request to each storage device containing one or more of the target data chunks in the selected set of data chunks and data paths. In some embodiments, task handler 538 may maintain status information for the compute tasks, such as indicating when requests are pending, complete, or in an error condition. Task handler 538 may be configured to receive the results of processing each compute task from the data nodes and/or storage devices. In some embodiments, task handler 538 may receive results from each compute task, aggregate the results in a processing request result, and, responsive to all compute tasks completing, return a processing result for the target data file to the requesting system, such as through storage interface 520.

Storage system 500 may include a plurality of modules or subsystems that are stored and/or instantiated in storage device memory 540 for execution by processor 514. For example, storage device memory 540 for each storage device in storage system 500 may include a storage management interface 542 configured to receive, process, and respond to storage management requests from client applications, data nodes, name nodes, and/or other nodes in storage system 100. Each storage device may include its own processor 514 for executing the functions or operations contained in storage device memory 540. Storage device memory 540 may include other modules (not shown) related to processing storage requests, such as storing data to or retrieving data from data store 580 in accordance with storage manager 526 and/or retrieving data chunks and processing compute tasks from task handler 538.

Storage management interface 542 may include an interface protocol or set of functions and parameters for receiving, processing, and responding to storage management requests, such as reporting operating parameters and estimates from the storage device. For example, storage management interface 542 may include functions for responding to estimate requests from device estimate handler 532. In some embodiments, storage management interface 542 may include a plurality of hardware and/or software modules configured to use processor 514 and storage device memory 540 to handle or manage defined operations of storage management interface 542. For example, storage management interface 542 may include an estimate request handler 544, a processing estimator 546, a latency estimator 548, a soft/hard error estimator 550, and an actual time reporter 552.

Estimate Request handler 544 may include data structures, functions, and interfaces for receiving estimate requests and providing estimated processing data in return. For example, estimate request handler 544 may receive an estimate request from device estimate handler 532, retrieve estimate values from one or more estimators, such as processing estimator 546, latency estimator 548, and/or soft/hard error estimator 550, and provide an estimate response message that includes estimate data values from the estimators. In some embodiments, estimate request handler 544 may be configured to provide responses periodically, rather than responsive to individual estimate requests.

Processing estimator 546 may include data structures, functions, and interfaces for estimating the processing time for a requested compute task. For example, processing estimator 546 may use a processing speed parameter and a size value for a target data chunk to determine an estimated processing time. In some embodiments, processing estimator 546 may include addition factors for determining the estimated processing time, such as the function type or a process demand value (operations per chunk size), reduced processor availability due to foreground or background data storage or management requests, correction factors, etc. In some embodiments, processing estimator 546 may be configured to receive a correction factor from feedback engine 536 and use it to correct future processing time estimates.

Latency estimator 548 may include data structures, functions, and interfaces for estimating the latency time for a requested compute task. For example, latency estimator 548 may use network, data node, and storage device latency values to estimate time delays between receipt of a compute task request, fetching the target data chunk, processing the data chunk, and returning a result. Network latency values may include the elapsed time for a compute task request from task handler 538 to reach the data node. Data node latency may include the elapsed time for a fetch request for the target data chunk to be generated and received by the storage device. Storage device latency may include the elapsed time to process a fetch request and return the target data chunk for processing. In some embodiments, latency estimator 548 may include addition factors for determining the estimated latency time, such as the request size, data chunk size, node or storage device queue depths, correction factors, etc. In some embodiments, latency estimator 548 may be configured to receive a correction factor from feedback engine 536 and use it to correct future latency time estimates.

Soft/hard error estimator 550 may include data structures, functions, and interfaces for estimating the likelihood and time delay for soft and hard errors for a requested compute task. For example, soft/hard error estimator 550 may use one or more error values from the operating parameters of the target storage device to estimate a likelihood of an error in processing the fetch request for the target data chunk. For example, a soft error estimate may be based on a program loop count, bit error rate, or error correction parameter for recent and/or historical storage requests to the storage device or storage location (block, die, endurance group, etc.) that stores the target data chunk. A hard error estimate may include a likelihood of unrecoverable error in reading the target data block and may include a high likelihood value for devices that are inaccessible, blacklisted, and/or have recently returned an unrecoverable error. In some embodiments, hard/soft error estimator 550 may include addition factors for determining the estimated error time, such as an error loop delay value, anticipated recovery time for hard errors, correction factors, etc. In some embodiments, soft/hard error estimator 550 may be configured to receive a correction factor from feedback engine 536 and use it to correct future error time or likelihood estimates.

Actual time reporter 552 may include data structures, functions, and interfaces for providing actual values corresponding to one or more estimated values calculated by processing estimator 546, latency estimator 548, and/or soft/hard error estimator 550. For example, actual time reporter 552 may receive operating parameters from the execution of a compute task by the storage device and corresponding data node and provide the operating parameters to feedback engine 536. In some embodiments, actual time reporter 552 may use one or more storage management reporting channels for reporting operating parameters to storage management services or applications.

Storage system 500 may include a plurality of modules or subsystems that are stored and/or instantiated in data node memory 560 for execution by processor 514. For example, data node memory 560 for each storage node or data processing node in storage system 500 may include a function processor 562 configured to receive, process, and respond to function processing requests from client applications, name nodes, other host nodes, and/or other nodes in storage system 100. Each data node may include its own processor 514 for executing the functions or operations contained in data node memory 560. Data node memory 560 may include other modules (not shown) related to processing storage requests, such as storing data to or retrieving data from data store 580 in accordance with storage manager 526 and/or retrieving data chunks and processing compute tasks from task handler 538.

Function processor 562 may include a set of functions and parameters for executing an assigned compute task that contributes to processing a host function request within the storage nodes without moving the input data back to the requesting host. For example, function processor 562 may identify target input data units, such as input data in data blocks 582 in data store 580, and then process the input data through one or more data functions, such as user or host data processing functions received through client request handler 522. In some embodiments, function processor 562 may be implemented in association with each compute resource that may be used to process one or more compute tasks, such as the host processor and memory and the processors and memories for each data node or storage node containing the target data chunks. Function processor 562 in each data node (or storage device) may fetch input data, process the compute task, and store intermediates or output data in parallel with other compute resources in other data nodes (or storage devices) for parallel processing of different parts of a data file. In some embodiments, function processor 562 may operate responsive to compute tasks assigned by scheduler 530 and initiated by task handler 538.

In some embodiments, function processor 562 may include a plurality of hardware and/or software modules configured to use processor 514 and data node memory 560 to handle or manage defined operations of function processor 562. For example, function processor 562 may include an input data fetcher 564, a compute processor 566, and a result manager 568.

Input data fetcher 564 may include functions, parameters, and/or logic for fetching a target input data unit, such as data chunks, data blocks, data symbols, data objects, and/or a data frame within another data unit that is the target of the assigned compute task, for executing one or more functions against. For example, input data fetcher 564 may identify a target data unit for retrieval and processing from data blocks 582 in data store 580 for the processing request. Upon receiving a compute tasks through task handler 538, input data fetcher 564 may identify the input data set in host data blocks 582 stored in the storage devices associated with the data node and initiate a fetch or read operation through the storage controller to the storage devices including the data blocks.

Compute processor 566 may include functions, parameters, and/or logic for processing the input data fetched by input data fetcher 564 in accordance with the functions and processing parameters in the compute configuration for the compute task. For example, compute processor 566 may receive a host function, a portion of a host function, or an indication of a predefined processing operation, targeting the selected data chunk. In some embodiments, compute processor 566 may be preconfigured with one or more standard host functions for processing specific data types, such as a portion of video or other media encoding or decoding algorithms, and the received compute configuration may indicate the selected host function and related parameters to be used for the compute task (without having to transfer the function itself). In some embodiments, compute processor 566 may execute compute task processing functions that include subunit processing functions configured to process or transform the data contents of a target subunit into an intermediate result to be stored and further processed by another node. Compute processor 566 may return one or more result data sets for handling by result manager 568.

Result manager 568 may include functions, parameters, and/or logic for storing the results of compute processor 566, at least temporarily, and returning them to the requesting system, generally through task handler 538. For example, results of compute processor 566 may be stored in a storage device, transfer buffer, or local memory of the data node. In some embodiments, results manager 568 may return the results data from the compute task in a response message to task handler 538.

Memory 516 may include additional logic and other resources (not shown) for processing data requests, such as modules for generating, queueing, and otherwise managing input/output data requests. Storage device memory 540 and data node memory 560 may include any number of additional data structures, functions, and interfaces for managing storage and processing requests for storage system 500.

Figure 6:
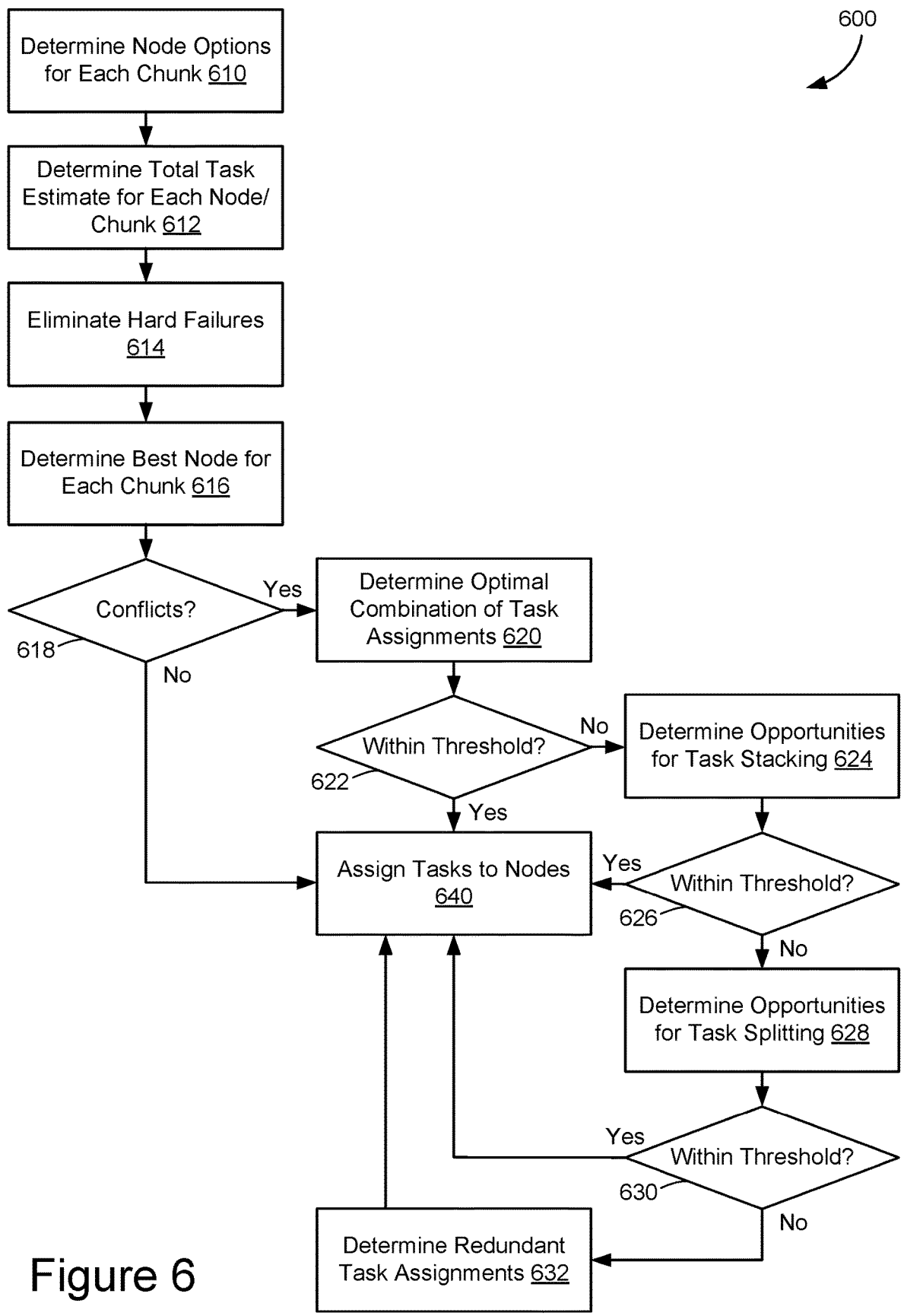
FIG. 6 is a flowchart of an example compute task assignment logic for redundant data chunks.

As shown in FIG. 6, storage system 500 may be operated according to an example method of assigning compute tasks among redundant data chunks, i.e. according to method 600 illustrated by blocks 610-640 in FIG. 6.

At block 610, storage node options for each data chunk may be determined. For example, based on a data file identifier, a scheduler in a name node may determine, using a metadata table containing block identifiers and locations, the storage locations of all redundant copies of each data chunk associated with the data file.

At block 612, a total task time estimate may be determined for each storage node and each data chunk. For example, a data node evaluator in a name node may use estimated processing data to determine a total task time estimate for each data path for each data chunk associated with the data file, allowing the comparison of the estimated times for different redundant copies of the data chunks.

At block 614, storage nodes may be eliminated for hard failures. For example, the data node evaluator may remove data paths for storage nodes or storage devices that are unresponsive, blacklisted, or report a high likelihood of hard failure.

At block 616, a best storage node may be determined for each data chunk to define a complete set of data chunks for rebuilding a data unit, such as a data file. For example, the data node evaluator may compare the total task time estimate for each data path for the redundant copies of a particular data chunk and select the lowest total task time among them for retrieving and processing that particular data chunk.

At block 618, whether or not there are conflicts that would present parallel processing of the best storage node selections is evaluated. For example, the data node evaluator may determine whether more than one data chunk was identified for the same storage node, storage device, or data processing node, which may allocate two compute tasks to the same compute resources or data path. If no, there is no conflict and method 600 may proceed to block 640. If yes, there is a conflict and method 600 may proceed to block 620.

At block 620, an optimal combination of task assignments may be determined. For example, the data node evaluator may determine each combination of storage nodes that provides a copy of each data chunk for the complete data file and does not require two data chunks from the same storage node, storage device, or data processing node. The longest total task time estimate for any of the parallel tasks in each combination may be used to determine the most optimal combination.

At block 622, whether or not the optimal combination is within a threshold time may be determined. For example, the data node evaluator may compare the longest total task time estimate for the most optimal combination to a time threshold, such as a requested or predetermined processing time for processing the file data. If yes, the combination is within threshold and method 600 may proceed to block 640. If no, the combination is not within threshold and method 600 may proceed to block 624.

At block 624, opportunities for task stacking may be determined. For example, the data node evaluator may determine whether multiple compute tasks may be handled by one or more storage nodes, storage devices, or data processing nodes to shorten the longest total task time, by relieving a slower storage node. In some instances, a fast or well-positioned storage node may be able to process multiple retrieval and compute tasks serially in less time than it takes another storage node to process a single task.

At block 626, whether or not the optimal combination is within a threshold time when using task stacking may be determined. For example, the data node evaluator may compare the longest total task time estimate (which may be the combined total task time for two or more tasks assigned to the same storage node) for the most optimal combination to the time threshold. If yes, the combination is within threshold and method 600 may proceed to block 640. If no, the combination is not within threshold and method 600 may proceed to block 628.

At block 628, opportunities for task splitting may be determined. For example, the data node evaluator may determine whether one or more compute tasks may be divided and handled by two or more storage nodes, storage devices, or data processing nodes to shorten the longest total task time. In some instances, a compute task and related data chunk may be split into smaller portions and divided among the redundant copies of the data chunk and their respective compute resources and data paths.

At block 630, whether or not the optimal combination is within a threshold time when using task splitting may be determined. For example, the data node evaluator may compare the longest total task time estimate (which may be the combined total task time for two or more tasks assigned to the same storage node) for the most optimal combination to the time threshold. If yes, the combination is within threshold and method 600 may proceed to block 640. If no, the combination is not within threshold and method 600 may proceed to block 632.

At block 632, redundant task assignments may be determined. For example, the data node evaluator may assign two (or more) storage nodes to the same compute task and the processing result may be based on the first results generated from the competing storage nodes. This may allow the data node evaluator to hedge that even slower resources may come in under estimate and having multiple data nodes attempting the compute task improves the likelihood. Redundant task assignments are most likely used only when there is a data node that is not otherwise needed for achieving the most optimal combinations determined at blocks 620, 624, or 630.

At block 640, compute tasks for the set of data chunks may be assigned to the storage nodes determined in the preceding block. For example, the data node evaluator may use the set of storage nodes and data paths for the complete set of data chunks and corresponding compute tasks determined at blocks 616, 620, 624, 628. and/or 632 to return a list of compute task assignments and target data block locations.

Figure 7:
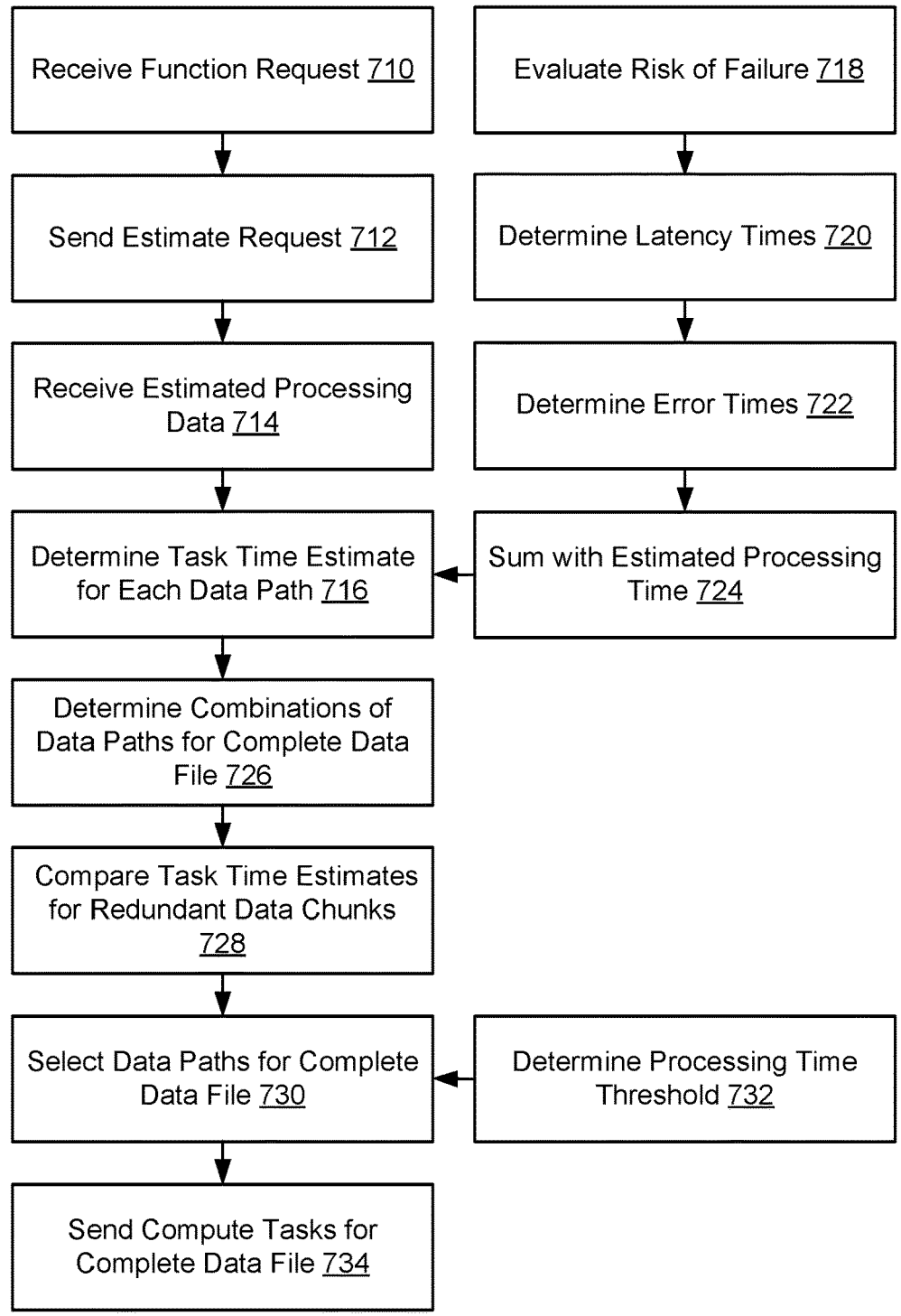
FIG. 7 is a flowchart of an example method of assigning compute tasks to storage or data nodes with redundant data chunks based on task time estimates.

As shown in FIG. 7, storage system 500 may be operated according to an example method of assigning compute tasks among redundant data chunks, i.e. according to method 700 illustrated by blocks 710-734 in FIG. 7.

At block 710, a function request may be received. For example, a host node including a name node may receive a function request for processing a target data file.

At block 712, estimate requests may be sent to storage nodes. For example, a scheduler in the name node may determine the storage nodes containing one or more data blocks associated with the target data file and send estimate requests for compute tasks targeting those data blocks to the corresponding storage nodes, data nodes, and/or storage devices.

At block 714, estimated processing data may be received. For example, the scheduler may receive estimate responses from each storage node responding to the estimate request with estimated processing times, latency times, and/or likelihood of errors.

At block 716, a total task time estimate may be determined for each data path. For example, the scheduler may estimate the total task time for each compute task and possible target data chunk for each storage node, storage devices, and/or data processing node that contains the corresponding data block, determining the estimate for each data path available for processing each data chunk.

An example method for determining the total task time estimate for a target data chunk and data path may be described in blocks 718-724. At block 718, risk of failure may be evaluated. For example, the scheduler may evaluate the likelihood of a hard error preventing successful retrieval and processing of the compute task for the target data chunk through the data path. The data path may be eliminated if the failure risk is too high or the estimated processing time may be adjusted by a risk factor to reduce the likelihood that the data path would be selected in an optimal combination. At block 720, an estimated latency time may be determined. For example, the scheduler may determine the latency time for the data path based on network, storage, and processing queue wait times. At block 722, an estimated error time may be determined. For example, the scheduler may determine an estimated error time for an estimated number of soft errors that require additional data retrieval time, such as retry attempts and/or additional decoding or recovery time. At block 724, the estimated latency time and estimated error time may be summed with the estimated processing time. For example, the scheduler may add the estimated latency time, the estimated error time, and/or a risk factor to an estimated processing time received from the data processing node with the target data chunk and return the resulting sum for the total task time estimate for the target data chunk and data path.

At block 726, combinations of data paths for processing a complete data file may be determined. For example, the scheduler may determine each combination of data paths to redundant data chunks to assemble a complete set of data chunks for the data file, such as one copy of each unique data block that may be assembled into the complete data file.

At block 728, task time estimates for redundant data chunks may be compared. For example, the scheduler may compare the total task time estimate for each redundant copy of a target data block and identify the data path to the redundant copy with the shortest total task time estimate.

At block 730, data paths for the complete data file may be selected. For example, the scheduler may select the data path for a copy of each data chunk with the shortest total task time estimate for each data chunk. In some embodiments, a more complex path selection logic may be used (such as described above with regard to method 600 in FIG. 6) and may be configured to use a processing time threshold to evaluate acceptable sets of compute task assignments. At block 732, the processing time threshold may be determined. For example, the function request may include a requested processing time and/or the system may include a predetermined processing time threshold. In some embodiments, selection of data paths may evaluate the optimal combination of compute task assignments to achieve the shortest total processing time without regard to a processing time threshold.

At block 734, the compute tasks for the complete data file may be sent to their respective storage nodes. For example, a task handler may send compute task requests for each data chunk to the selected storage node, storage device, and/or data processing node to retrieve and process the compute task.

Figure 8:
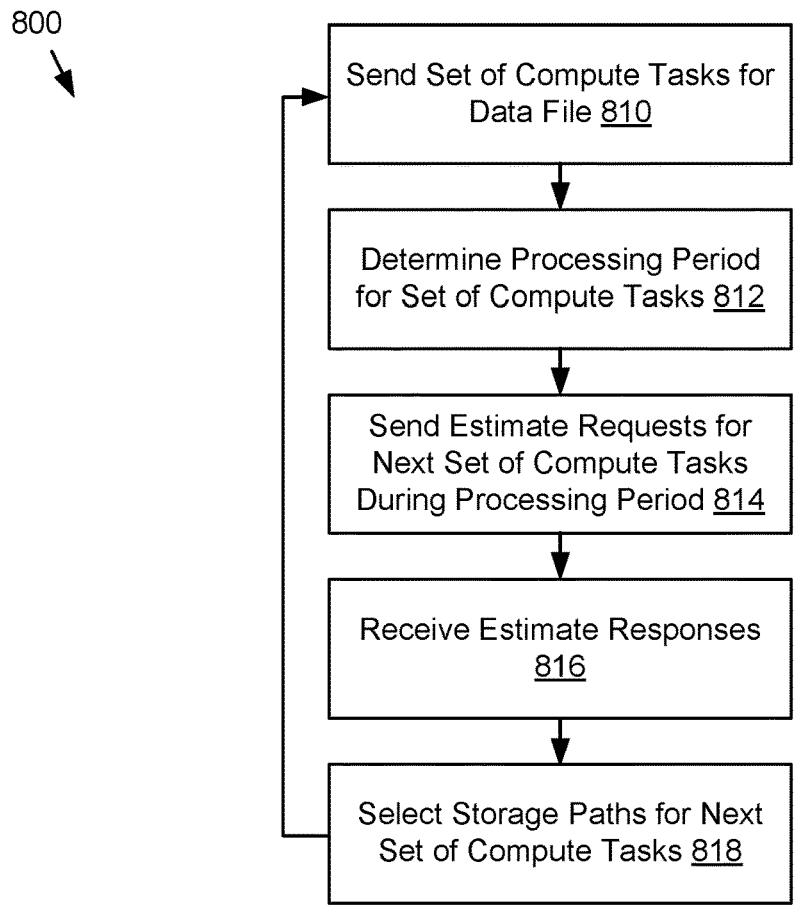
FIG. 8 is a flowchart of an example method of scheduling estimate requests for estimate-based compute task assignment.

As shown in FIG. 8, storage system 500 may be operated according to an example method of scheduling estimate requests for a series of processing tasks, i.e. according to method 800 illustrated by blocks 810-818 in FIG. 8.

At block 810, a set of compute tasks for a data file may be sent to storage nodes for processing. For example, a name node may send compute tasks to storage nodes containing a set of data chunks corresponding to the data file based on assignments made using method 600 in FIG. 6 and/or method 700 in FIG. 7.

At block 812 a processing period for the set of compute tasks may be determined. For example, a device estimate handler in the name node may determine the processing period based on the longest total task time estimate for any of the parallel compute tasks assigned.

At block 814, estimate requests for a next set of compute tasks may be sent during the processing period. For example, at a determined request time, the device estimate handler may send estimate requests to the storage nodes corresponding to data blocks for the next data file in a queue of processing requests to be processed in series. In some embodiments, each estimate request may be sent following an elapsed portion of the processing period corresponding to the estimated total task time estimate for the prior compute task assigned to that storage node. The request times would correspond to the estimated total task time estimate for the prior compute tasks assigned to that storage node.

At block 816, estimate responses may be received from the storage nodes. For example, the device estimate handler may receive an estimate response including processing estimate data for the next compute tasks that could be assigned to that storage node, storage device, and/or data processing node.

At block 818, storage paths for the next set of compute tasks for the next data file may be selected. For example, the name node may select the compute tasks for the set of data chunks corresponding to the next data file and method 800 may return to block 810 to continue processing the queue of data files in the function request queue.

Figure 9:
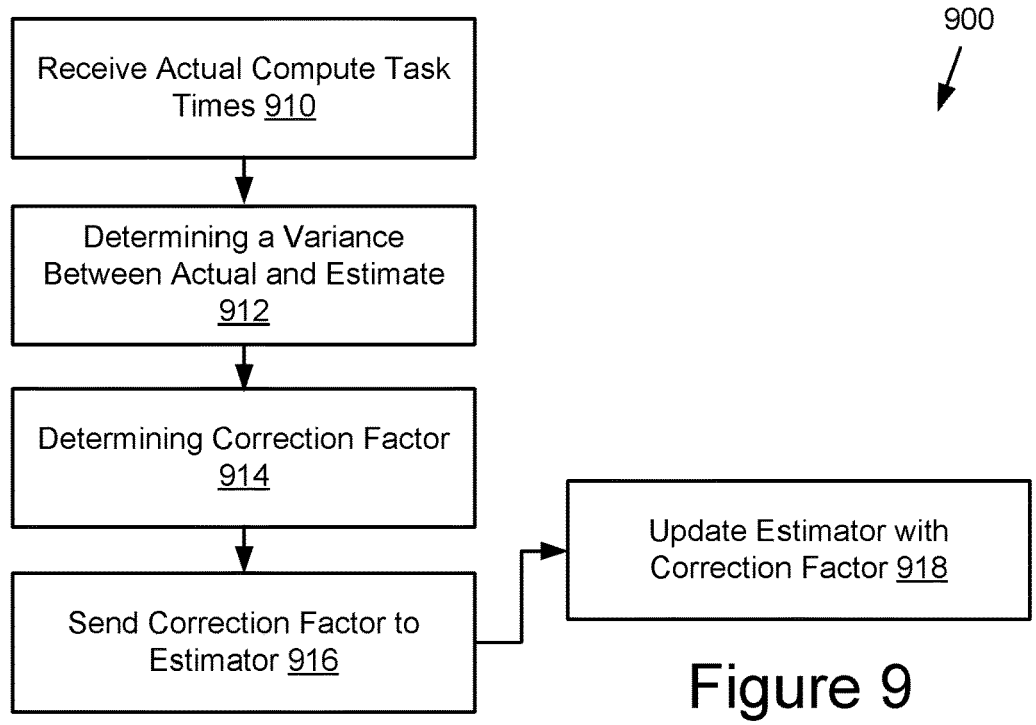
FIG. 9 is a flowchart of an example method for feedback and correction of estimators for estimate-based compute task assignment.

As shown in FIG. 9, storage system 500 may be operated according to an example method of correcting the estimators used by storage nodes, i.e. according to method 900 illustrated by blocks 910-918 in FIG. 9.

At block 910, actual compute task times may be received. For example, a feedback engine in a name node may receive actual task times for the compute tasks completed by each storage node processing a prior compute task for a data file.

At block 912, a variance may be determined between actual and estimated processing times. For example, the feedback engine may calculate at least one variance between the newly received actual processing time and the estimated processing time. In some embodiments, variances may be calculated for various total processing time components, including processing time estimates, latency estimates, and error time estimates, and may be based on a statistical analysis of estimates and actual data for the storage node over time and/or over a population of similar storage nodes.

At block 914, a correction factor may be determined. For example, based on one or more variances determined at block 912, the feedback engine may calculate a correction factor for one or more estimators in the storage node, storage devices, or data processing node, such as a processing estimator, latency estimator, and/or soft/hard error estimator.

At block 916, the correction factor may be sent. For example, the feedback engine may send the correction factor to the storage node, storage device, and/or data processing node with the estimator to be corrected.

At block 918, the estimator may be updated with the correction factor. For example, the storage node, storage device, and/or data processing node may receive the correction factor, identify the estimator corresponding to the correction factor and add or update the correction factor in the estimator for future estimation calculations.

Figure 10:
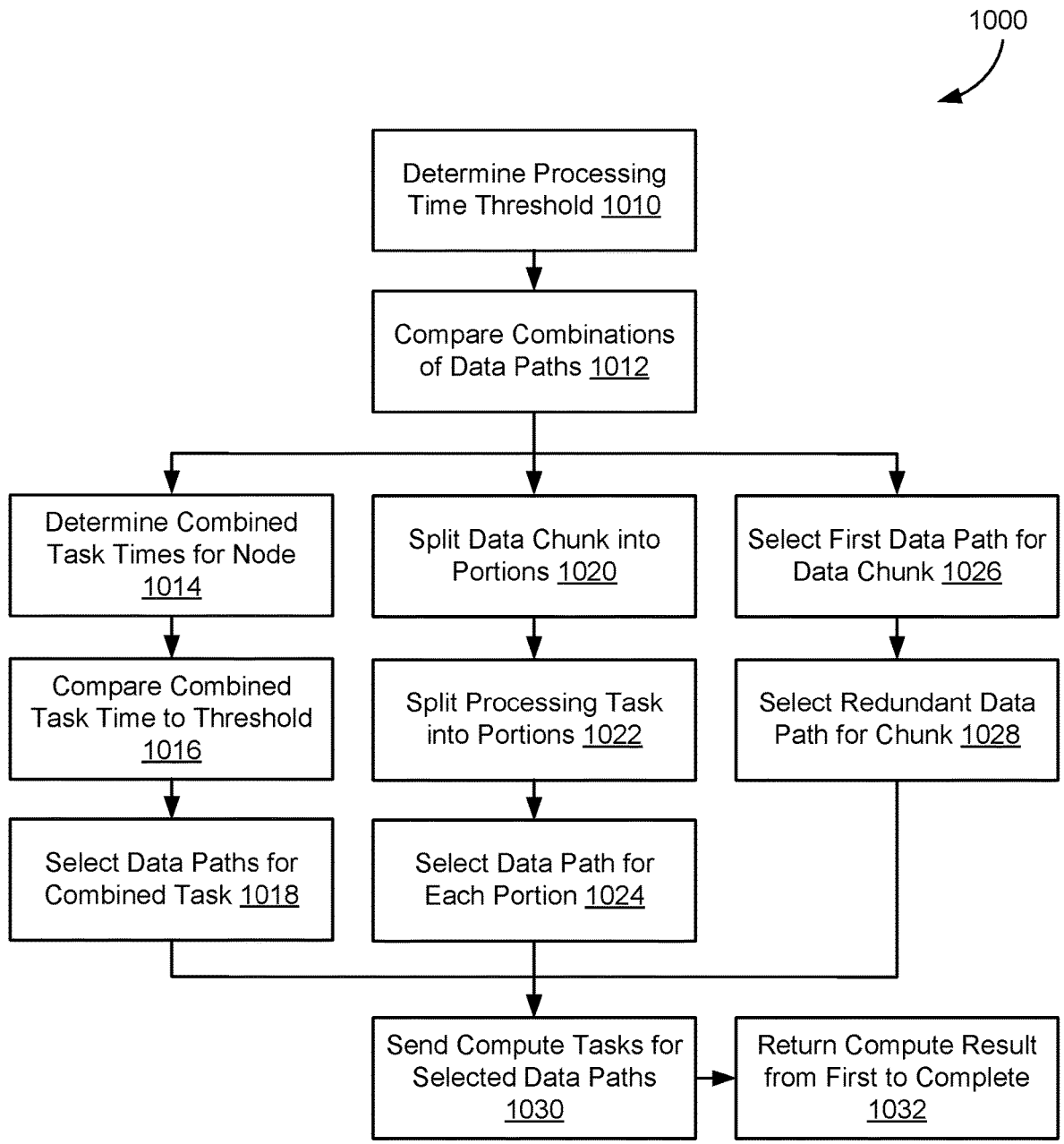
FIG. 10 is a flowchart of an example method of manipulating compute tasks to meet processing time thresholds for estimate-based compute task assignment.

As shown in FIG. 10, storage system 500 may be operated according to an example method of selecting a set of data paths for the retrieval and processing of redundant data blocks, i.e. according to method 1000 illustrated by blocks 1010-1032 in FIG. 10.

At block 1010, a processing time threshold may be determined. For example, a scheduler in a data node may be configured to receive a requested processing time from a function request or use a predetermined processing time from a system configuration.

At block 1012, combinations of data paths may be compared. For example, the scheduler may compare each combination of data paths that may be used to retrieve and process a copy of each data chunk for a complete set of data blocks for a data file and determine the relative total processing time values for each combination. In some embodiments, block 1012 may include comparison of each combination of data paths assuming one compute task per storage node, storage device, and/or data processing node. For example, each data node may only receive one compute request for one data chunk accessible through that data node.

Blocks 1014-1018 may include additional logic for evaluating stacking compute tasks in series on selected storage nodes. At block 1014, combined task times for handling two or more compute tasks in series on a single storage node may be determined. For example, the scheduler may determine additional combinations of assignments where storage nodes estimating low total processing times for multiple data chunks may be assigned multiple data chunks. At block 1016, the combined task times may be compared to the task time threshold. For example, the scheduler may determine whether multiple compute tasks processed in series in a storage node are less than the processing time threshold. At block 1018, the data paths for the combined compute tasks on the same storage node may be selected. For example, the scheduler may determine that the combined task time is less than the processing time threshold and evaluate additional combinations of data paths enabled by the combined tasks for improving the total processing time for all parallel assignments for the set of data chunks.

Blocks 1020-1024 may include additional logic for evaluating splitting compute tasks across multiple storage nodes containing redundant copies of the same data block. At block 1020, a data chunk may be split into portions. For example, the scheduler may evaluate whether splitting one or more data blocks across two or more storage nodes for retrieval and processing will enable combinations that improve total parallel processing time and split a target data chunk into two or more portions for processing. At block 1022, the processing task may be split into portions. For example, the compute task corresponding to the data chunk may similarly be split into portions by the scheduler and the total task time for each portion may be recalculated based on the reduced task processing time estimate. At block 1024, data paths for each portion may be selected. For example, the scheduler may evaluate combinations that include the split data chunks and compute tasks to determine whether they improve the total parallel processing time and select a set of data paths that include the split data chunk.

Block 1026-1028 and 1032 may include additional logic for evaluating contingency assignment of one or more compute tasks across multiple copies of the data chunk on different storage nodes. At block 1026, a first data path for the data chunk may be selected. For example, the scheduler may select a first storage node, storage device, and/or data processing node that includes the data chunk for assigning the compute task. At block 1028, a second data path for the data chunk may be selected. For example, the scheduler may select a second storage node, storage device, and/or data processing node that includes the data chunk for making a contingency assignment of the compute task. In some embodiments, the first data path may be the best available data path for the data chunk and the second data path may be an unused data path that has not been assigned to another data chunk and would otherwise not be used for processing the set of compute tasks for the data file. At block 1032, only the first compute result completed may be returned in the function result. For example, the task handler may wait for a compute task result from both the first data path and the second data path, but only return or use the first task result received for the data chunk.

At block 1030, compute tasks for the selected data paths may be sent. For example, a task handler may send compute task requests for each data chunk to the selected storage node, storage device, and/or data processing node to retrieve and process the compute task.

Figure 11:
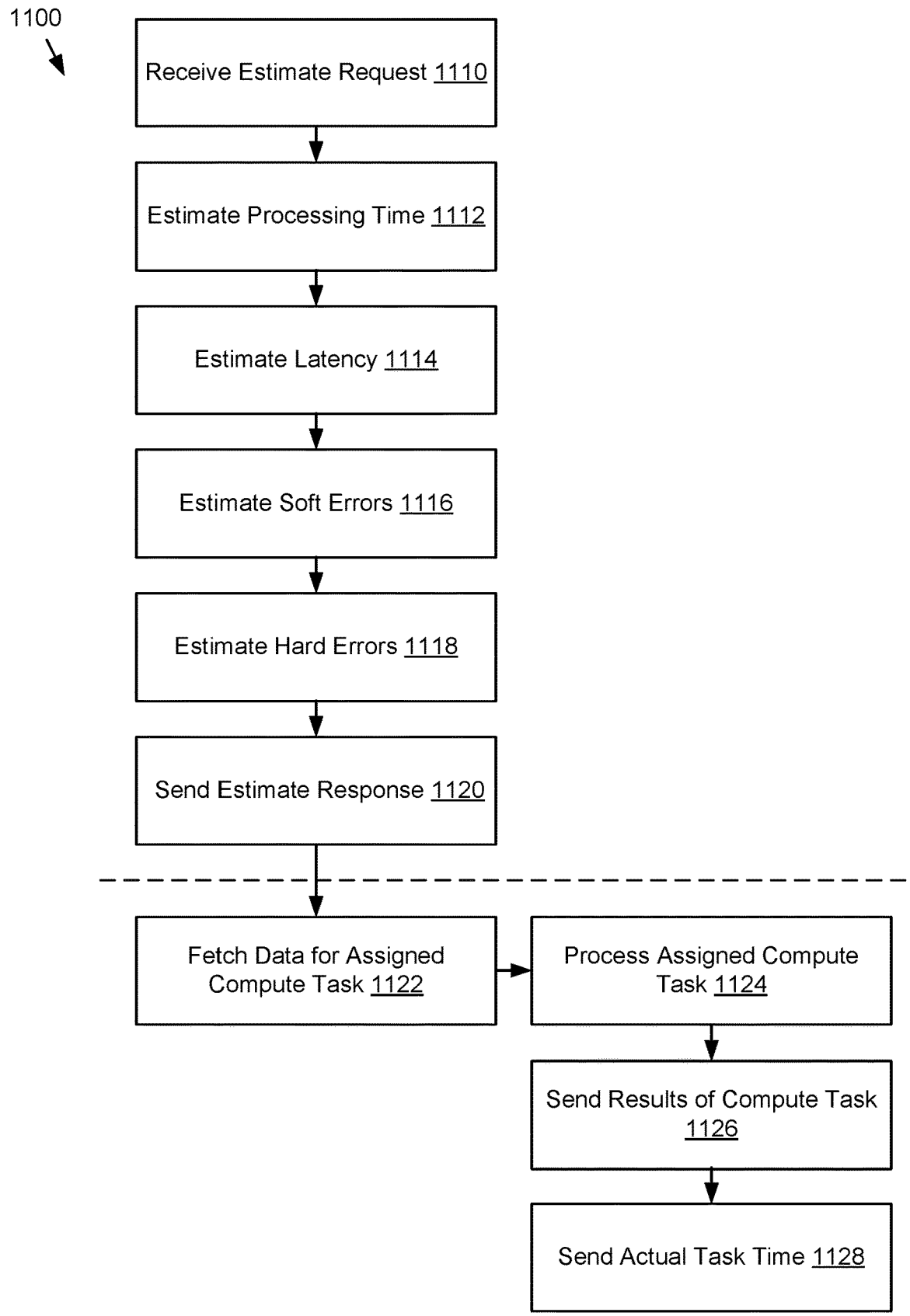
FIG. 11 is a flowchart of an example method of supporting estimate-based compute task assignment from storage or data nodes and storage devices.

As shown in FIG. 11, storage system 500 may be operated according to an example method of providing estimated processing data and retrieving and processing of compute tasks for redundant data blocks, i.e. according to method 1100 illustrated by blocks 1110-1128 in FIG. 11. In some embodiments, method 1100 may be executed by a storage node and/or associated storage devices and/or data processing nodes. For example, each storage node may be a data node that includes a storage controller running a function processor or similar data processing node and a plurality of storage devices storing the relevant data chunks.

At block 1110, an estimate request may be received. For example, a storage node may receive an estimate request for a specific data chunk or group of data chunks and related compute tasks.

At block 1112, an estimated processing time may be estimated. For example, a processing estimator in the storage node may estimate the time each compute task would be expected to take given current processing resources, the size of the target data chunks, and the processing requirements of the compute task.

At block 1114, an estimated latency time may be estimated. For example, a latency estimator in the storage node may estimate the time each compute task would wait for network, storage device, function processor, and other resources for fetching and processing the data chunk.

At block 1116, estimated soft errors may be estimated. For example, an error estimator may estimate the likelihood, number, and/or type of soft errors that may be expected for retrieving the data chunks.

At block 1118, estimated hard errors may be estimated. For example, an error estimator may estimate the likelihood of one or more hard errors, meaning that fetching the target data chunk would fail.

At block 1120, an estimate response may be sent back to the estimate requester. For example, the storage node may generate and send an estimate response message back to the name node or other estimate requester including estimated processing data based on the estimates determined at blocks 1112, 1114, 1116, and/or 1118.

At block 1122, responsive to the compute task being assigned to the storage node, data may be fetched for the assigned compute task. For example, the storage node may process a fetch or read request to retrieve the target data chunk from one or more storage devices.

At block 1124, the assigned compute task may be processed. For example, a function processor in the storage node, such as a data processing node in a storage device or storage controller, may process the fetched data chunk according to the assigned compute task.

At block 1126, the results of the compute task may be sent back to the requester. For example, the storage node may return the results of the compute task to the name node, client node, or another host node for combination with the results of the other compute tasks for the data file.

At block 1128, actual task time values may be sent. For example, the storage node may report the actual task time values for the compute task, including processing time, latency times, and any error times, for use by a feedback engine to update or correct the estimators responsible for the estimates at blocks 1112, 1114, 1116, and 1118.

While at least one exemplary embodiment has been presented in the foregoing detailed description of the technology, it should be appreciated that a vast number of variations may exist. It should also be appreciated that an exemplary embodiment or exemplary embodiments are examples, and are not intended to limit the scope, applicability, or configuration of the technology in any way. Rather, the foregoing detailed description will provide those skilled in the art with a convenient road map for implementing an exemplary embodiment of the technology, it being understood that various modifications may be made in a function and/or arrangement of elements described in an exemplary embodiment without departing from the scope of the technology, as set forth in the appended claims and their legal equivalents.

As will be appreciated by one of ordinary skill in the art, various aspects of the present technology may be embodied as a system, method, or computer program product. Accordingly, some aspects of the present technology may take the form of an entirely hardware embodiment, an entirely software embodiment (including firmware, resident software, micro-code, etc.), or a combination of hardware and software aspects that may all generally be referred to herein as a circuit, module, system, and/or network. Furthermore, various aspects of the present technology may take the form of a computer program product embodied in one or more computer-readable mediums including computer-readable program code embodied thereon.

Any combination of one or more computer-readable mediums may be utilized. A computer-readable medium may be a computer-readable signal medium or a physical computer-readable storage medium. A physical computer readable storage medium may be, for example, but not limited to, an electronic, magnetic, optical, crystal, polymer, electromagnetic, infrared, or semiconductor system, apparatus, or device, etc., or any suitable combination of the foregoing. Non-limiting examples of a physical computer-readable storage medium may include, but are not limited to, an electrical connection including one or more wires, a portable computer diskette, a hard disk, random access memory (RAM), read-only memory (ROM), an erasable programmable read-only memory (EPROM), an electrically erasable programmable read-only memory (EEPROM), a Flash memory, an optical fiber, a compact disk read-only memory (CD-ROM), an optical processor, a magnetic processor, etc., or any suitable combination of the foregoing. In the context of this document, a computer-readable storage medium may be any tangible medium that can contain or store a program or data for use by or in connection with an instruction execution system, apparatus, and/or device.

Computer code embodied on a computer-readable medium may be transmitted using any appropriate medium, including but not limited to, wireless, wired, optical fiber cable, radio frequency (RF), etc., or any suitable combination of the foregoing. Computer code for carrying out operations for aspects of the present technology may be written in any static language, such as the C programming language or other similar programming language. The computer code may execute entirely on a user's computing device, partly on a user's computing device, as a stand-alone software package, partly on a user's computing device and partly on a remote computing device, or entirely on the remote computing device or a server. In the latter scenario, a remote computing device may be connected to a user's computing device through any type of network, or communication system, including, but not limited to, a local area network (LAN) or a wide area network (WAN), Converged Network, or the connection may be made to an external computer (e.g., through the Internet using an Internet Service Provider).

Various aspects of the present technology may be described above with reference to flowchart illustrations and/or block diagrams of methods, apparatus, systems, and computer program products. It will be understood that each block of a flowchart illustration and/or a block diagram, and combinations of blocks in a flowchart illustration and/or block diagram, can be implemented by computer program instructions. These computer program instructions may be provided to a processing device (processor) of a general purpose computer, special purpose computer, or other programmable data processing apparatus to produce a machine, such that the instructions, which can execute via the processing device or other programmable data processing apparatus, create means for implementing the operations/acts specified in a flowchart and/or block(s) of a block diagram.

Some computer program instructions may also be stored in a computer-readable medium that can direct a computer, other programmable data processing apparatus, or other device(s) to operate in a particular manner, such that the instructions stored in a computer-readable medium to produce an article of manufacture including instructions that implement the operation/act specified in a flowchart and/or block(s) of a block diagram. Some computer program instructions may also be loaded onto a computing device, other programmable data processing apparatus, or other device(s) to cause a series of operational steps to be performed on the computing device, other programmable apparatus or other device(s) to produce a computer-implemented process such that the instructions executed by the computer or other programmable apparatus provide one or more processes for implementing the operation(s)/act(s) specified in a flowchart and/or block(s) of a block diagram.

A flowchart and/or block diagram in the above figures may illustrate an architecture, functionality, and/or operation of possible implementations of apparatus, systems, methods, and/or computer program products according to various aspects of the present technology. In this regard, a block in a flowchart or block diagram may represent a module, segment, or portion of code, which may comprise one or more executable instructions for implementing one or more specified logical functions. It should also be noted that, in some alternative aspects, some functions noted in a block may occur out of an order noted in the figures. For example, two blocks shown in succession may, in fact, be executed substantially concurrently, or blocks may at times be executed in a reverse order, depending upon the operations involved. It will also be noted that a block of a block diagram and/or flowchart illustration or a combination of blocks in a block diagram and/or flowchart illustration, can be implemented by special purpose hardware-based systems that may perform one or more specified operations or acts, or combinations of special purpose hardware and computer instructions.

While one or more aspects of the present technology have been illustrated and discussed in detail, one of ordinary skill in the art will appreciate that modifications and/or adaptations to the various aspects may be made without departing from the scope of the present technology, as set forth in the following claims.

The invention claimed is:

1. A system, comprising:
    at least one memory;
    at least one processor; and
    a host controller, stored in the at least one memory and executable by the at least one processor, to perform operations including:
        receiving estimated processing data for a plurality of storage nodes, wherein:
            the plurality of storage nodes is configured to include redundant copies of a plurality of target data chunks for processing in a set of compute tasks;
            the set of compute tasks is configured to target a set of target data chunks from the redundant copies of the plurality of target data chunks;
            the set of target data chunks is configured to include at least one copy from the redundant copies for each target data chunk in the plurality of target data chunks; and
            the estimated processing data is configured to include a soft error estimate of correctable errors in a data retrieval process for each storage node of the plurality of storage nodes;
        determining, based on estimated processing data and a plurality of data paths to redundant copies of each target data chunk, a task time estimate for each data path of the plurality of data paths;
        selecting at least one data path for each target data chunk in the set of target data chunks for processing in the set of compute tasks; and
        sending the set of compute tasks using the selected at least one data path for each target data chunk in the set of target data chunks.

2. The system of claim 1, wherein:
    the operations further include:
        sending, during a processing period for a prior set of compute tasks, an estimate request to each storage node of the plurality of storage nodes;
    receiving the estimated processing data for the plurality of storage nodes includes receiving, during the processing period for the prior set of compute tasks, the estimated processing data for at least one compute task of the set of compute tasks from each storage node of the plurality of storage nodes; and
    the set of compute tasks follows the prior set of compute tasks in a series of compute tasks processed by the host controller.

3. The system of claim 1, wherein the estimated processing data is further configured to include a plurality of estimate values selected from:
    a task processing time estimate;
    a latency estimate; and
    a hard error estimate.

4. The system of claim 1, wherein:
    the estimated processing data is further configured to include a task processing time estimate and a latency estimate;
    determining the task time estimate for each data path of the plurality of data paths is further based on the task processing time estimate, the latency estimate, and the soft error estimate; and
    the operations further include:
        comparing, for redundant copies of a target data chunk, the task time estimate for each data path to select the at least one data path to the target data chunk.

5. The system of claim 1, wherein the operations further include:
    determining a processing time threshold for the set of compute tasks: and
    selecting, using the processing time threshold, the at least one data path for each target data chunk.

6. The system of claim 5, wherein:
    each data path to each storage node of the plurality of storage nodes is configured to include a data processing node configured to execute a compute task for a corresponding data chunk in a target storage device; and
    the operations further include:
        determining a combined task time for at least two compute tasks for a target data processing node;
        comparing the combined task time to the processing time threshold for the set of compute tasks; and
        selecting, responsive to the processing time threshold meeting at least the combined task time, data paths through the target data processing node for target data chunks for the at least two compute tasks.

7. The system of claim 5, wherein:
    each target data chunk has a corresponding compute task in the set of compute tasks; and
    the operations further include, responsive to the task time estimate for at least one data path to redundant copies of a target data chunk exceeding the processing time threshold:
        splitting the target data chunk into at least two data chunk portions;
        splitting a corresponding compute task into at least two compute task portions;
        selecting a first data path for a first storage node from the plurality of storage nodes for a first data chunk portion of the at least two data chunk portions; and
        selecting a second data path for a second storage node from the plurality of storage nodes for a second data chunk portion of the at least two data chunk portions.

8. The system of claim 5, wherein:
   each target data chunk has a corresponding compute task in the set of compute tasks; and
   the operations further include, responsive to the task time estimate for at least one data path to redundant copies of a target data chunk exceeding the processing time threshold:
      selecting a first data path for a first storage node from the plurality of storage nodes for the target data chunk and corresponding compute task;
      selecting a second data path for a second storage node from the plurality of storage nodes for the target data chunk and corresponding compute task; and
      returning a compute result for a first completed corresponding compute task from between the first data path and the second data path.

9. The system of claim 1, wherein the operations further include:
   receiving actual task time values from the set of compute tasks that used the selected at least one data path for each target data chunk;
   determining at least one variance between actual task time values and task time estimates;
   determining, based on the at least one variance, at least one correction factor for an estimator used to generate task time estimates; and
   sending the at least one correction factor to the estimator for generating future task time estimates.

10. The system of claim 1, further comprising:
    the plurality of storage nodes configured to:
       store, in a plurality of storage devices, a target data file, wherein the redundant copies of data chunks correspond to redundant portions of the target data file; and
       determine estimated processing data for the set of compute tasks; and
    a plurality of data processing nodes configured to:
       process the set of compute tasks using the target data chunks, wherein the at least one data path to each target data chunk includes at least one corresponding data processing node of the plurality of data processing nodes; and
       return a compute task result for each compute task of the set of compute tasks.

11. A computer-based method, comprising:
    receiving estimated processing data for a plurality of storage nodes, wherein:
       the plurality of storage nodes includes redundant copies of a plurality of target data chunks for processing in a set of compute tasks;
       the set of compute tasks targets a set of target data chunks from the redundant copies of the plurality of target data chunks;
       the set of target data chunks includes at least one copy from the redundant copies for each target data chunk in the plurality of target data chunks; and
       the estimated processing data includes a soft error estimate of correctable errors in a data retrieval process for each storage node of the plurality of storage nodes;
    determining, based on estimated processing data and a plurality of data paths to redundant copies of each target data chunk, a task time estimate for each data path of the plurality of data paths;
    selecting at least one data path for each target data chunk in the set of target data chunks to be processed using the set of compute tasks; and
    sending the set of compute tasks for processing using the selected at least one data path for each target data chunk in the set of target data chunks.

12. The computer-based method of claim 11, further comprising:
    sending, during a processing period for a prior set of compute tasks, an estimate request to each storage device of the plurality of storage nodes, wherein:
       receiving the estimated processing data for the plurality of storage nodes includes receiving, during the processing period for the prior set of compute tasks, the estimated processing data for at least one compute task of the set of compute tasks from each storage node of the plurality of storage nodes; and
       the set of compute tasks follows the prior set of compute tasks in a series of compute tasks.

13. The computer-based method of claim 11, wherein the estimated processing data further includes a plurality of estimate values selected from:
    a task processing time estimate;
    a latency estimate; and
    a hard error estimate.

14. The computer-based method of claim 11, further comprising:
    comparing, for redundant copies of a target data chunk, the task time estimate for each data path to select the at least one data path to the target data chunk, wherein:
       the estimated processing data further includes a task processing time estimate and a latency estimate; and
       determining the task time estimate for each data path of the plurality of data paths is further based on the task processing time estimate and the latency estimate.

15. The computer-based method of claim 11, further comprising:
    determining a processing time threshold for the set of compute tasks: and
    selecting, using the processing time threshold, the at least one data path for each target data chunk.

16. The computer-based method of claim 15, further comprising:
    determining a combined task time for at least two compute tasks for a data processing node;
    comparing the combined task time to the processing time threshold for the set of compute tasks; and
    selecting, responsive to the processing time threshold meeting at least the combined task time, data paths through the data processing node for target data chunks for the at least two compute tasks.

17. The computer-based method of claim 15, further comprising, responsive to the task time estimate for at least one data path to redundant copies of a target data chunk exceeding the processing time threshold:
    splitting the target data chunk into at least two data chunk portions;
    splitting a corresponding compute task into at least two compute task portions;
    selecting a first data path for a first storage device from the plurality of storage nodes for a first data chunk portion of the at least two data chunk portions; and
    selecting a second data path for a second storage device from the plurality of storage nodes for a second data chunk portion of the at least two data chunk portions.

18. The computer-based method of claim 15, further comprising, responsive to the task time estimate for at least one data path to redundant copies of a target data chunk exceeding the processing time threshold:

selecting a first data path for a first storage node from the plurality of storage nodes for the target data chunk and corresponding compute task;

selecting a second data path for a second storage node from the plurality of storage nodes for the target data chunk and corresponding compute task; and returning a compute result for a first completed corresponding compute task from between the first data path and the second data path.

19. The computer-based method of claim 11, further comprising:

receiving actual task time values from the set of compute tasks that used the selected at least one data path for each target data chunk;

determining at least one variance between actual task time values and task time estimates;

determining, based on the at least one variance, at least one correction factor for an estimator used to generate task time estimates; and sending the at least one correction factor to the estimator for generating future task time estimates.

20. A system, comprising:

a plurality of storage nodes configured to store, in a plurality of storage devices, a target data file as redundant copies of a plurality of target data chunks;

a plurality of data processing nodes corresponding to the plurality of storage nodes and configured to process a set of compute tasks using the plurality of target data chunks for the target data file, wherein:

the set of compute tasks targets a set of target data chunks from the redundant copies of the plurality of target data chunks; and the set of target data chunks includes at least one copy from the redundant copies for each target data chunk in the plurality of target data chunks for the target data file;

means for receiving estimated processing data for the plurality of storage devices for each redundant copy of the redundant copies of data chunks, wherein the estimated processing data includes a soft error estimate of correctable errors in a data retrieval process for each storage device of the plurality of storage devices;

means for determining, based on the estimated processing data and a plurality of data paths to redundant copies of each target data chunk, a task time estimate for each data path of the plurality of data paths;

means for selecting at least one data path for each data chunk in the set of target data chunks to be processed using the set of compute tasks; and means for sending the set of compute tasks for processing using the selected at least one data path for each data chunk in the set of target data chunks.

* * * * *